April 8, 1952     W. L. MOREY ET AL     2,591,715
SHIP MANEUVERING AND BATTLE TACTICS TRAINER
Filed Nov. 2, 1945     18 Sheets-Sheet 1

INVENTORS
WILLIAM L. MOREY
ROBERT A. TAYLOR

ATTORNEY

April 8, 1952 W. L. MOREY ET AL 2,591,715
SHIP MANEUVERING AND BATTLE TACTICS TRAINER
Filed Nov. 2, 1945 18 Sheets-Sheet 2

INVENTORS
WILLIAM L. MOREY
ROBERT A. TAYLOR
BY
ATTORNEY

April 8, 1952 W. L. MOREY ET AL 2,591,715
SHIP MANEUVERING AND BATTLE TACTICS TRAINER
Filed Nov. 2, 1945 18 Sheets-Sheet 3

FIG. 5ª

INVENTORS
WILLIAM L. MOREY
ROBERT A. TAYLOR
BY
ATTORNEY

April 8, 1952     W. L. MOREY ET AL     2,591,715
SHIP MANEUVERING AND BATTLE TACTICS TRAINER
Filed Nov. 2, 1945     18 Sheets-Sheet 4

INVENTORS
WILLIAM L. MOREY
ROBERT A. TAYLOR

BY Joseph Chappell

ATTORNEY

April 8, 1952 W. L. MOREY ET AL 2,591,715
SHIP MANEUVERING AND BATTLE TACTICS TRAINER
Filed Nov. 2, 1945 18 Sheets-Sheet 5

INVENTORS
WILLIAM L. MOREY
ROBERT A. TAYLOR

BY
ATTORNEY

April 8, 1952 W. L. MOREY ET AL 2,591,715
SHIP MANEUVERING AND BATTLE TACTICS TRAINER
Filed Nov. 2, 1945 18 Sheets-Sheet 6

INVENTORS
WILLIAM L. MOREY
ROBERT A. TAYLOR
BY
ATTORNEY

April 8, 1952     W. L. MOREY ET AL     2,591,715
SHIP MANEUVERING AND BATTLE TACTICS TRAINER
Filed Nov. 2, 1945     18 Sheets-Sheet 8

INVENTORS
WILLIAM L. MOREY
ROBERT A. TAYLOR

ATTORNEY

INVENTORS
WILLIAM L. MOREY
ROBERT A. TAYLOR

BY

ATTORNEY

April 8, 1952 W. L. MOREY ET AL 2,591,715
SHIP MANEUVERING AND BATTLE TACTICS TRAINER
Filed Nov. 2, 1945 18 Sheets-Sheet 10

INVENTORS
WILLIAM L. MOREY
ROBERT A. TAYLOR
BY
ATTORNEY

April 8, 1952 W. L. MOREY ET AL 2,591,715
SHIP MANEUVERING AND BATTLE TACTICS TRAINER
Filed Nov. 2, 1945 18 Sheets-Sheet 11

INVENTORS
WILLIAM L. MOREY
ROBERT A. TAYLOR
BY
*Joseph L Chappell*
ATTORNEY

April 8, 1952     W. L. MOREY ET AL     2,591,715
SHIP MANEUVERING AND BATTLE TACTICS TRAINER
Filed Nov. 2, 1945     18 Sheets-Sheet 12
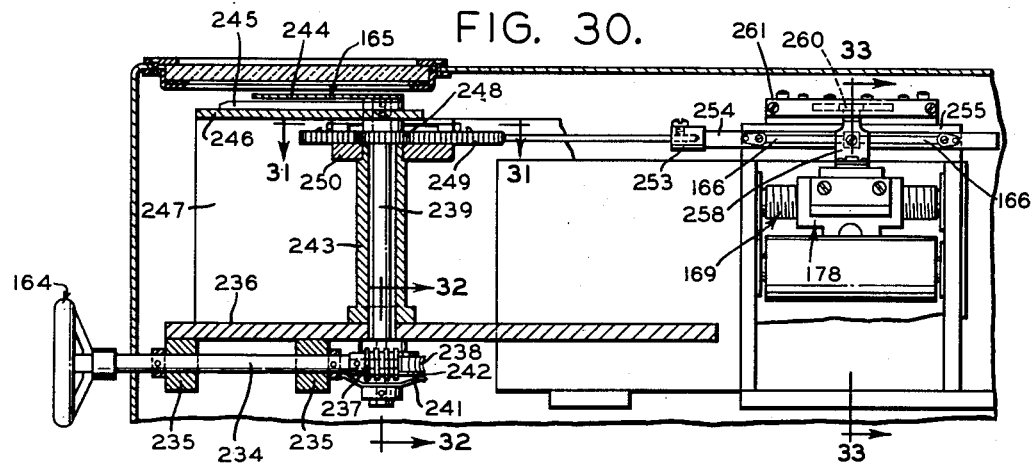
FIG. 30.
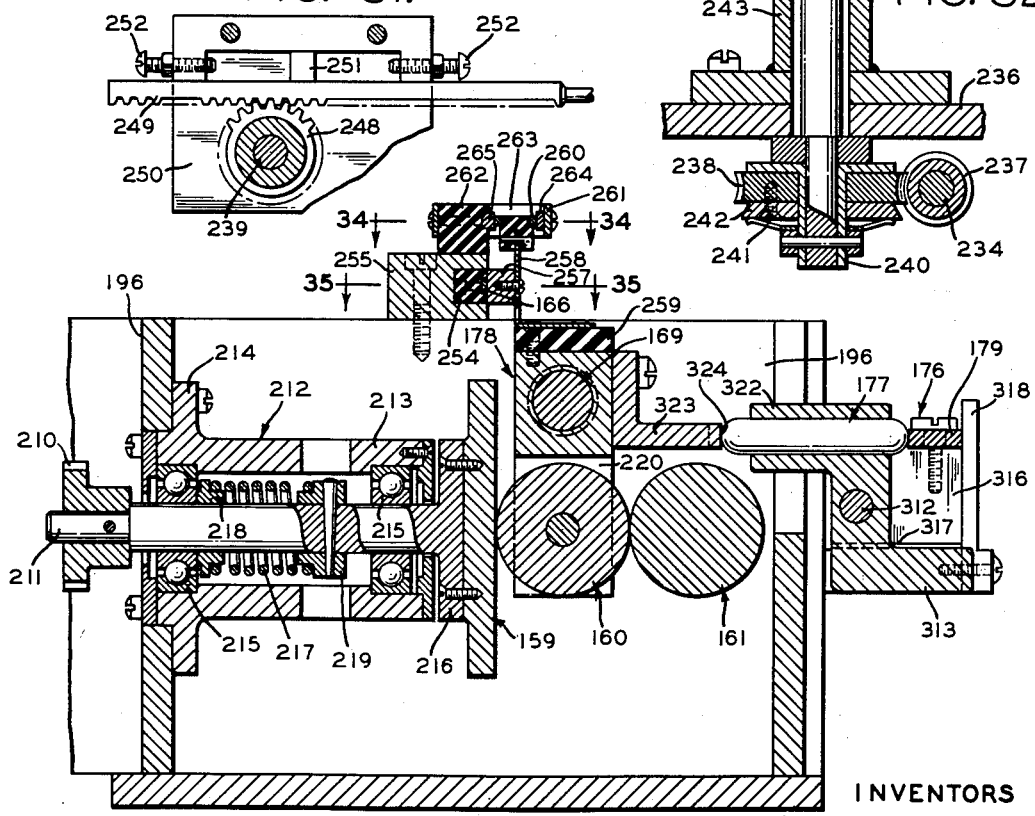
FIG. 31.
FIG. 32.
FIG. 33.
INVENTORS
WILLIAM L. MOREY
ROBERT A. TAYLOR
BY
ATTORNEY

FIG. 35.ª

INVENTORS
WILLIAM L. MOREY
ROBERT A. TAYLOR

April 8, 1952  W. L. MOREY ET AL  2,591,715
SHIP MANEUVERING AND BATTLE TACTICS TRAINER
Filed Nov. 2, 1945  18 Sheets-Sheet 14
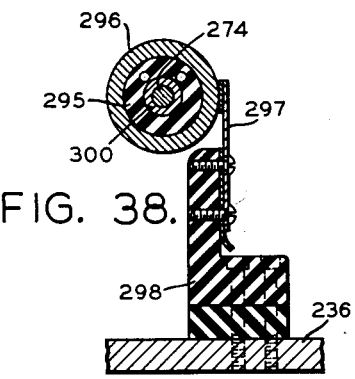
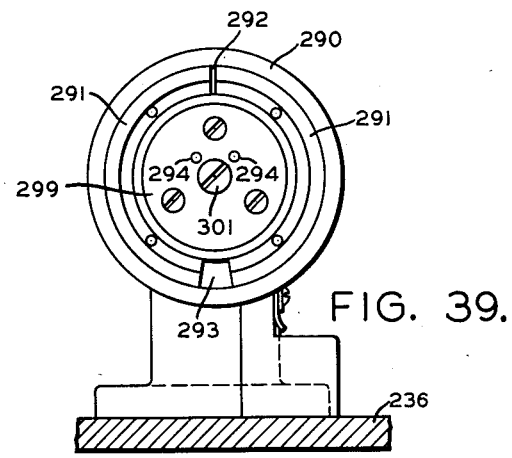
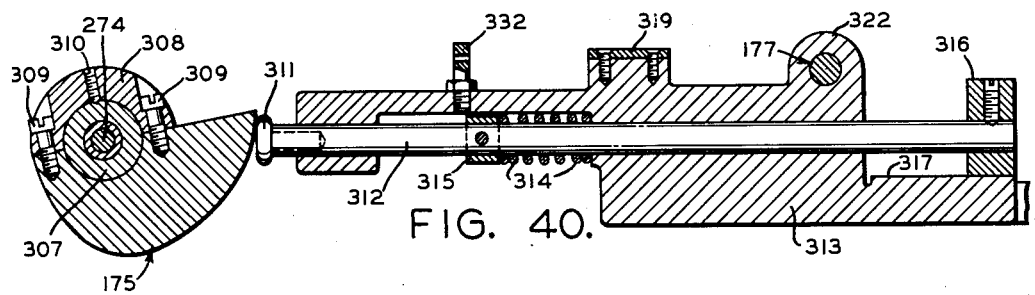
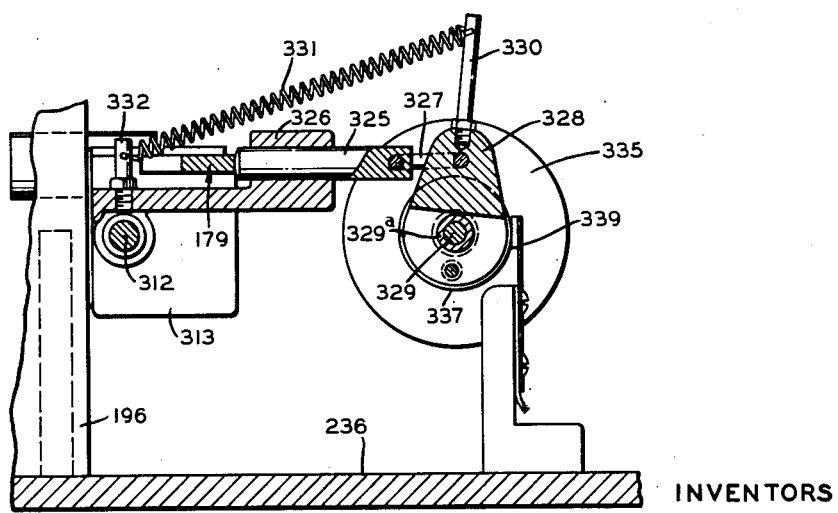
INVENTORS
WILLIAM L. MOREY
ROBERT A. TAYLOR
BY
ATTORNEY April 8, 1952     W. L. MOREY ET AL     2,591,715
SHIP MANEUVERING AND BATTLE TACTICS TRAINER
Filed Nov. 2, 1945     18 Sheets-Sheet 15
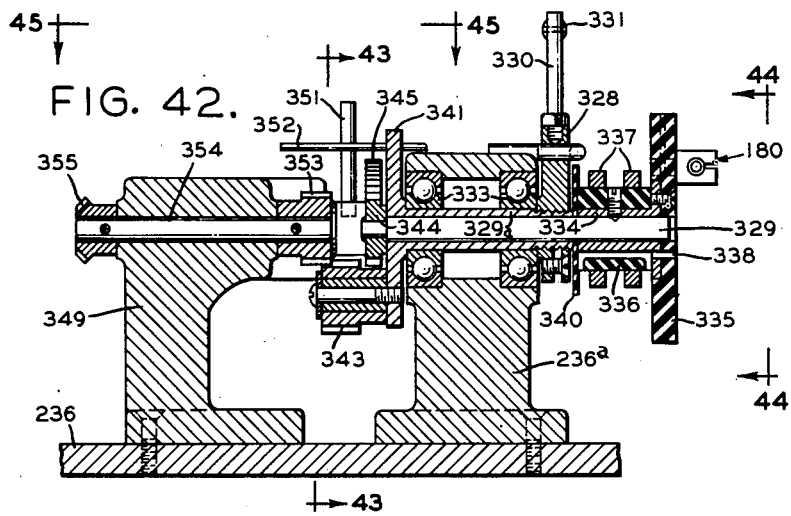
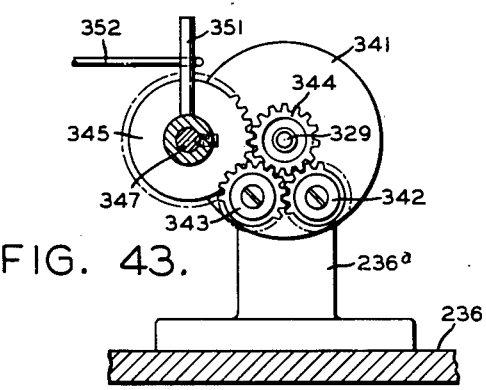
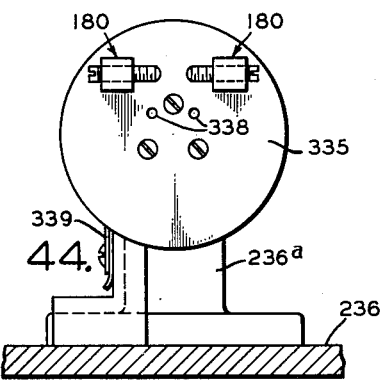
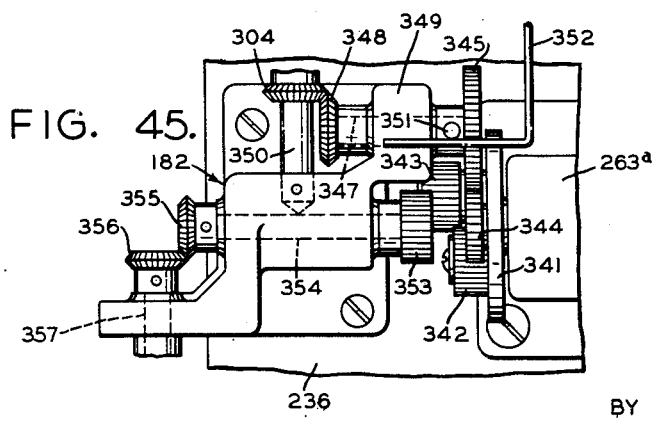
INVENTORS
WILLIAM L. MOREY
ROBERT A. TAYLOR
BY
ATTORNEY April 8, 1952 W. L. MOREY ET AL 2,591,715
SHIP MANEUVERING AND BATTLE TACTICS TRAINER
Filed Nov. 2, 1945 18 Sheets-Sheet 16
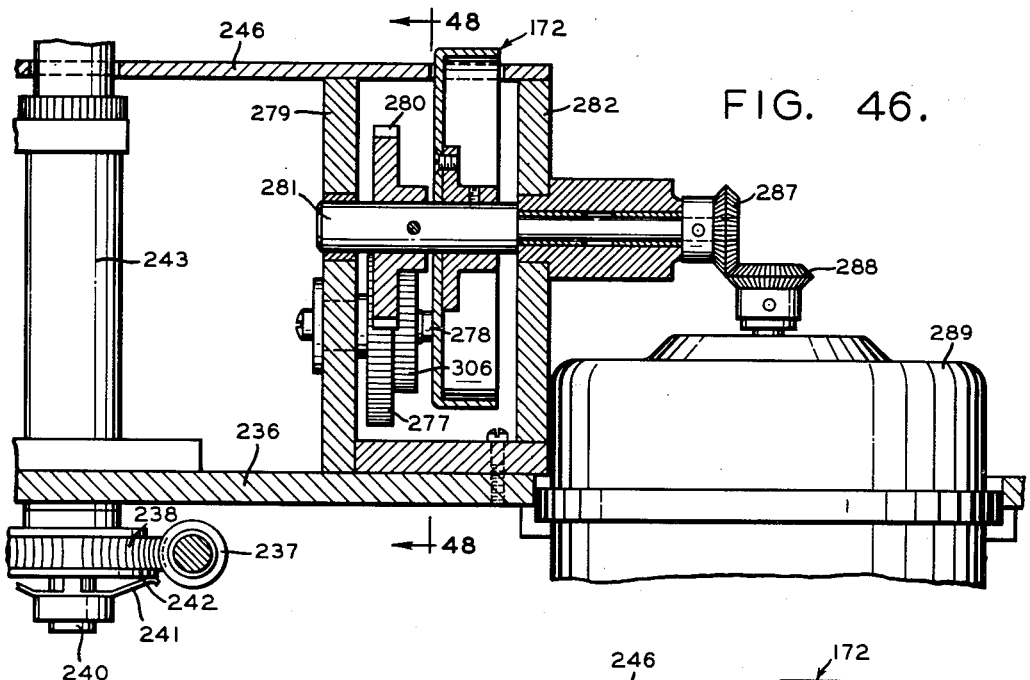
FIG. 46.
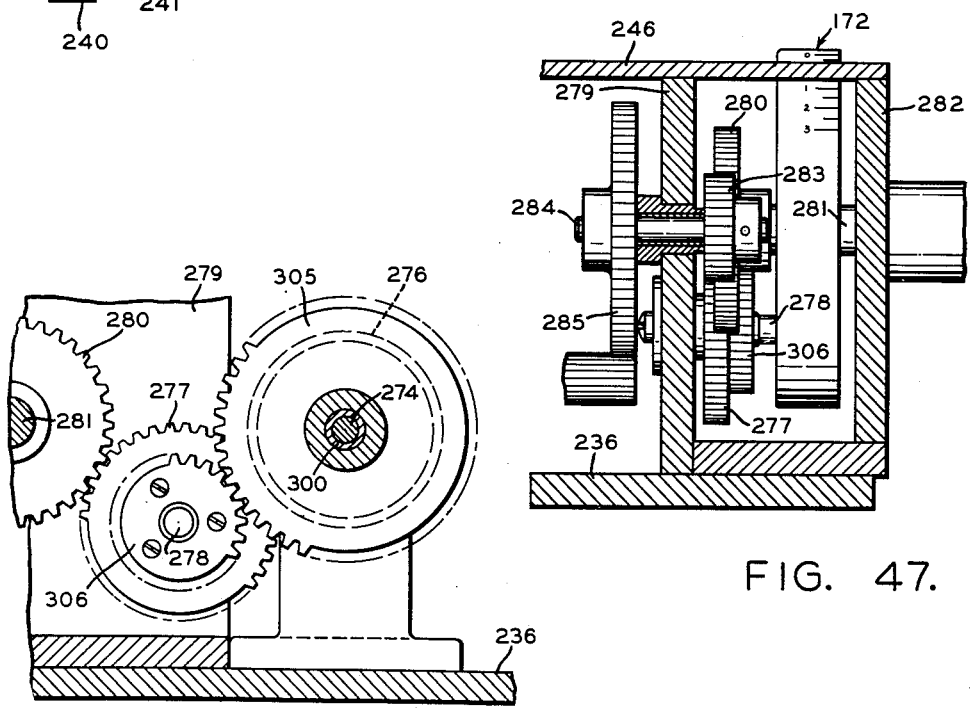
FIG. 47.
FIG. 48.
INVENTORS
WILLIAM L. MOREY
ROBERT A. TAYLOR
BY
ATTORNEY April 8, 1952 W. L. MOREY ET AL 2,591,715
SHIP MANEUVERING AND BATTLE TACTICS TRAINER
Filed Nov. 2, 1945 18 Sheets-Sheet 17

FIG. 49.ª

INVENTORS
WILLIAM L. MOREY
ROBERT A. TAYLOR
BY
ATTORNEY

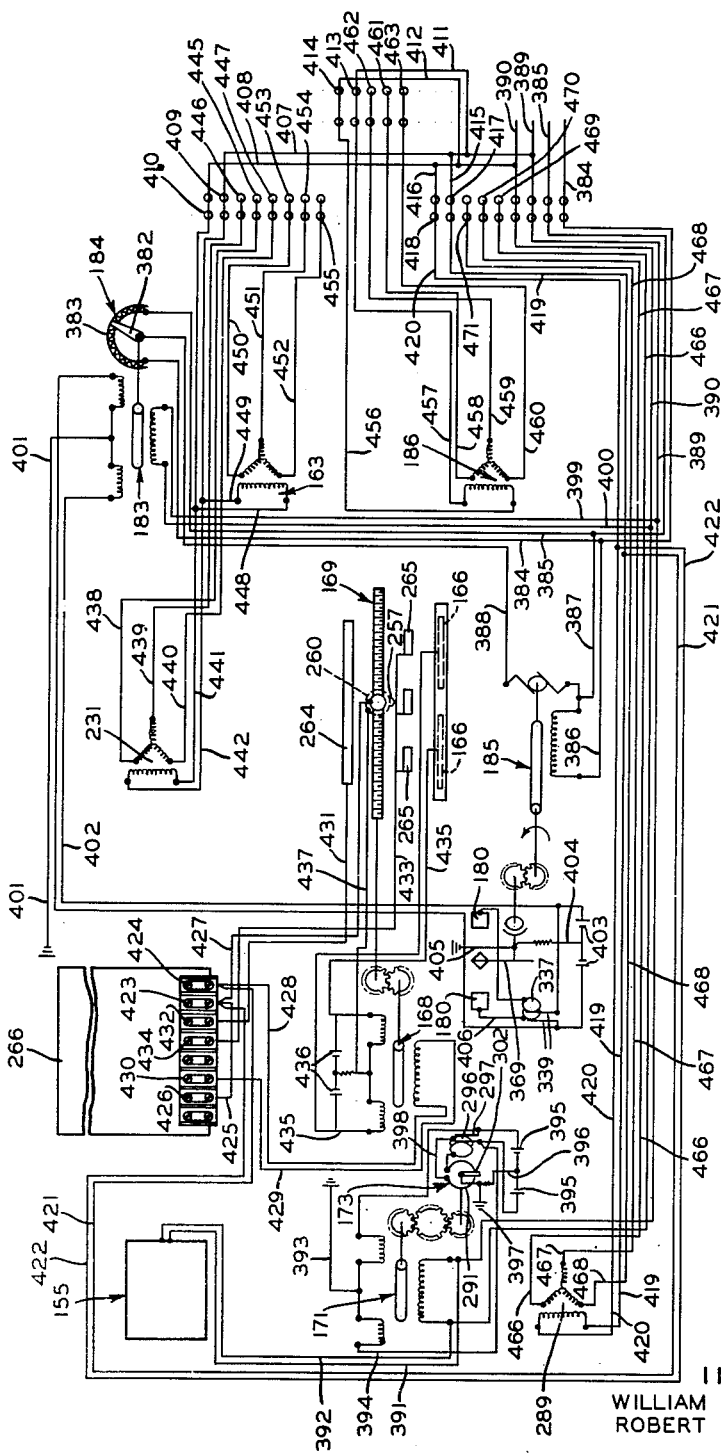

Patented Apr. 8, 1952

2,591,715

UNITED STATES PATENT OFFICE 2,591,715

SHIP MANEUVERING AND BATTLE TACTICS TRAINER

William L. Morey, Melrose, and Robert A. Taylor, Newburyport, Mass.

Application November 2, 1945, Serial No. 626,416

41 Claims. (Cl. 35—25)

(Granted under the act of March 3, 1883, as amended April 30, 1928; 370 O. G. 757)

Our invention relates to training apparatus. It has to do, more particularly, with apparatus for use in teaching ship maneuvering and battle tactics.

The apparatus we have provided is for use in shore based schools for the training of officers and combat intelligence center teams in ship maneuvers and battle tactics for torpedo attacks, surface gunnery, laying smoke screens, convoy shielding, and similar ship problems.

Throughout the following specification we shall employ the term "combat intelligence center" or "CIC." The combat intelligence center on a United States Navy warship is that center or plotting room aboard the ship to which all information from various officers and teams throughout the ship, that is necessary to plot and execute the proper maneuvering of the ship and to plan and execute the battle tactics of the ship, is conveyed. So far as CIC training is concerned, the use of the apparatus of our invention is virtually the equivalent of permitting practice with two ships at sea, one representing an enemy ship and the other the operator's own ship.

Prior to the development of our invention, there was a need for synthetically producing on a plotting table or tracer the relative movements and tracks of both an imaginary ship and an imaginary target, each proceeding independently of the other under different combinations of rudder angle and speed as selected by the operator of the control for each, all in the manner of one conning a ship. It was also recognized that it was desirable for the possible ship's tracks, so indicated and traced, to conform as to maneuverability, to the patterns characteristic of an average USN ship, for example a destroyer.

Prior to our invention, officers afloat were acutely aware that shipboard CIC practice work was greatly hampered by inability to practice realistically, and to improvise precision attack methods capable of duplication at sea under actual battle conditions.

It is the general objective of our invention to provide apparatus which will continuously indicate in miniature on a plotting surface the relative movements and resulting tracks of both an imaginary ship and an imaginary target, each proceeding independently of the other under different combinations of rudder angle and speed as selected by the operator of the control for each, all in the manner of one conning a ship. Furthermore it is another objective of our invention that the possible ship's tracks so indicated by our apparatus will conform, as to maneuverability, to the patterns characteristic of and average USN ship, such as a destroyer. In short, it is the objective of our invention to produce equipment that will:

1. Permit simulation of the maneuvering of two ships.

2. Permit the control of such maneuvering of each ship to be accomplished under conditions realistic of those afloat, namely, by manipulating either the rudder angle indicator or the speed indicator, or both.

3. Permit such maneuvering of each ship to be within the limits and in pattern characteristic of a typical USN destroyer.

4. Permit such maneuvering of each ship to be indicated in a greatly reduced scale on a plotting surface which shows the relative positions of the two ships.

The preferred embodiment of our invention comprises electro-mechanical apparatus which includes units of two types. One of these units is a double plotting or tracing table and the other a control unit.

The double plotting or tracing table is of such a nature that the relative positions of two ships will be indicated simultaneously on a horizontal plotting surface. Also, the tracks made by these ships may be plotted on such surface. The horizontal plotting surface consists of a translucent plate beneath which lights of different characteristics, indicating an imaginary ship and an imaginary target, are moved so as to indicate the relative positions of these imaginary ships on the translucent plate. This arrangement permits observation on the plotting surface of the speed and course of not merely one but of two ships, and also of the bearing and range of each to each. The two ship indicating lights are carried by separate carriages each of which is mounted beneath the translucent plate for independent movements. Each carriage may be moved North-South, East-West, or any component of such movements. The North-South movement of each carriage is effected by a step motor operatively connected to the carriage and the East-West movement is accomplished by a similar motor which is also operatively connected to the carriage. Thus, a pair of step motors is provided for effecting the desired movements of each carriage. In addition, the position of either carriage may be changed manually, independently of the other, at any time, either North-South or East-West, or both. This resetting of the carriages manually may be accomplished independently of the N-S or E-W step motors and their respective operating connections to the carriages.

A control unit is provided for supplying electric impulses to each pair of step motors that effects the movements, indicated above, of each carriage. Thus, a separate control unit is provided for moving each carriage to cause the light carried thereby to indicate the track followed by the imaginary ship which the light represents. The design and construction of these control units is intricate, due to the necessity of having the limits and characteristics of the ship's maneuverability conform, as to timing the rates of change of heading, to those of an actual ship. In our control unit, maneuverability computations take into account the following factors encountered in the maneuvering of an actual ship, for example, a USN destroyer:

1. On a sustained course (i. e., rudder amidship) both the acceleration and deceleration must be representative of the ship's response to commands for forward speed changes (not involving engine reversals).

2. On commands for change in rudder angle, the ship:

(a) Will continue initial course without appreciable change in either course or speed for approximately 15 sec.;

(b) Will thereafter change its heading at a gradually accelerated rate until the rate of change of heading equals that of the ship in its turning circle, this period of heading acceleration requiring approximately 20 sec.;

(c) In that period between the start of the change in the ship's heading and the reaching of the turning circle, the ship's approach speed will gradually reduce or decay until the constant speed in the turning circle is reached;

(d) While in a turning circle, the ship's speed will be approximately 80% of that prior to the start of change in the ship's heading; and (e) Sustained rudder angle will cause the ship to track in coincident turning circles.

3. The diameter of the turning circle is a function of both the approach speed and the rudder angle.

The control unit which we have designed will move the carriage which is controls in such a manner that all of the above-indicated characteristics of maneuverability of an actual ship are simulated realistically.

Thus, our apparatus will project a light on a translucent plotting surface and the movement of such light relative to the plotting surface will have all the maneuver characteristics of a USN destroyer in a calm sea, except for:

(a) The effect of engine reversals which are not provided for in our control unit;

(b) The rate of speed deceleration in our control unit is the same as that of acceleration which does not exactly duplicate the action of an actual ship;

(c) The effects of wind and water.

The preferred embodiment of our invention is illustrated in the accompanying drawings wherein similar characters of reference designate corresponding parts and wherein:

Fig. 5a is a plan view, partially broken away, of a clutch unit which may be associated with the gear unit of Fig. 5.

Fig. 30 is a vertical sectional view of a portion of the control unit that operates the rudder angle indicator.

Fig. 31 is a horizontal sectional view taken along line 31—31 of Fig. 30.

Fig. 32 is a vertical sectional view taken along line 32—32 of Fig. 30.

Fig. 33 is a vertical sectional view taken along line 33—33 of Fig. 30.

Fig. 35a is a view showing the relative positions of the switch structures of Figs. 34 and 35.

Fig. 38 is a vertical sectional view taken along line 38—38 of Fig. 37.

Fig. 39 is a vertical sectional view taken along line 39—39 of Fig. 37.

Fig. 40 is a vertical sectional view taken along line 40—40 of Fig. 27.

Fig. 41 is a vertical sectional view taken along line 41—41 of Fig. 27.

Fig. 42 is a vertical sectional view taken along line 42—42 of Fig. 27.

Fig. 43 is a vertical sectional view taken along line 43—43 of Fig. 42.

Fig. 44 is an end view taken along line 44—44 of Fig. 42.

Fig. 45 is a top view taken along line 45—45 of Fig. 42.

Fig. 46 is a vertical sectional view taken along line 46—46 of Fig. 27.

Fig. 47 is a vertical sectional view taken along line 47—47 of Fig. 27.

Fig. 48 is a vertical sectional view taken along line 48—48 of Fig. 46.

Fig. 49a is a side elevational view, partly broken away, of the tachometer of the control unit.

Fig. 51 is a wiring diagram of the control unit.

Figure 1:
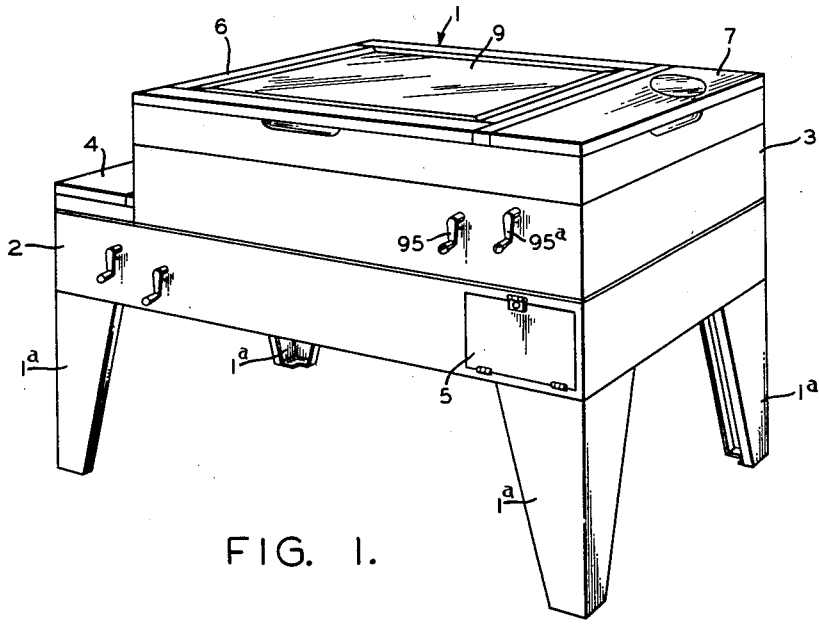
Fig. 1 is a perspective view of the double plotting or tracing table of my apparatus.
Figure 2:
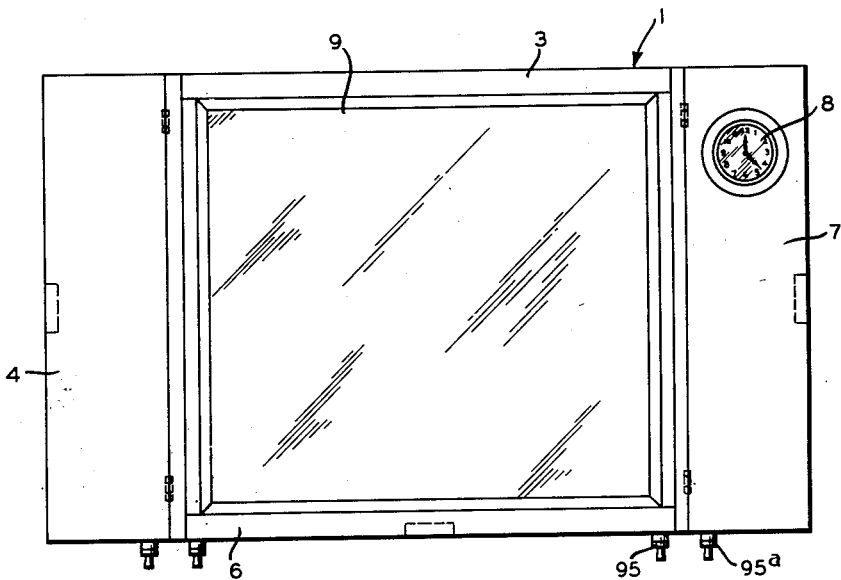
Fig. 2 is a plan view of the table.

With reference to the drawings, in Figs. 1 to 22 we have illustrated the double plotting or tracing table 1 of our apparatus. As previously indicated this table is provided with movable indicators for indicating the relative tracks or paths of two imaginary ships, one of which will be termed "own ship" and the other "enemy ship."

The mechanism of the table is incorporated in the housing illustrated best in Figs. 1 to 4. This housing is supported at a suitable height by the legs 1a. The housing consists of a lower section 2 and an upper section 3, the upper section being of somewhat less area than the lower section so as to provide an extension of the lower section which is provided with a hinged cover 4. The lower section 2 of the table is adapted to contain the mechanism which indicates the track of the enemy ship while the upper section 3 is adapted to contain the mechanism which indicates the track of own ship. Access can be had to the mechanism in the lower section 2 by means of the cover 4 and also by means of a hinged door 5 provided in the side of the section 2 at the opposite end.

The upper section 3 is provided with a hinged cover 6 which covers the greater part of the area thereof. A hinged cover 7 is provided for covering the remainder of the area and is for the purpose of permitting access to the mechanism provided at the end of the section. The member 7 may carry a clock 8. The cover 6 will also permit access to the interior mechanism of the table. The cover 6 consists mainly of a transparent plate 9 which may be of glass or plastic.

As will be apparent hereinafter, the images of both the enemy ship indicating light and own ship indicating light appear beneath this plate 9. The tracks of both of these ships may be traced on the plate and, preferably, the plate will be covered with translucent tracing paper for this purpose. The mechanism for indicating movements of an enemy ship and own ship, as previously indicated, includes a movable carriage for each ship. Each carriage carries a light and is adapted to be moved in N-S and E-W directions or any component of such directions. The mechanism for moving the enemy ship carriage is completely independent of the mechanism for moving own ship carriage. Both of these mechanisms are practically identical and it will, therefore, be necessary to describe only one in detail.

Figure 3:
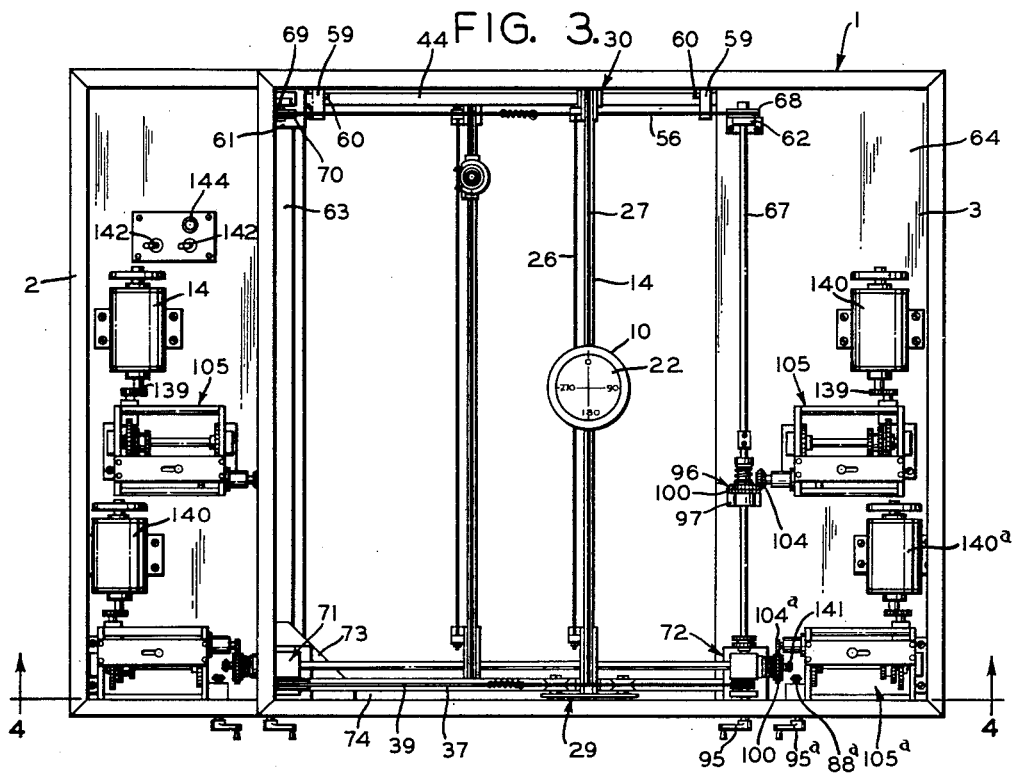
Fig. 3 is a horizontal sectional view of the table taken substantially along line 3—3 of Fig. 4.
Figure 4:
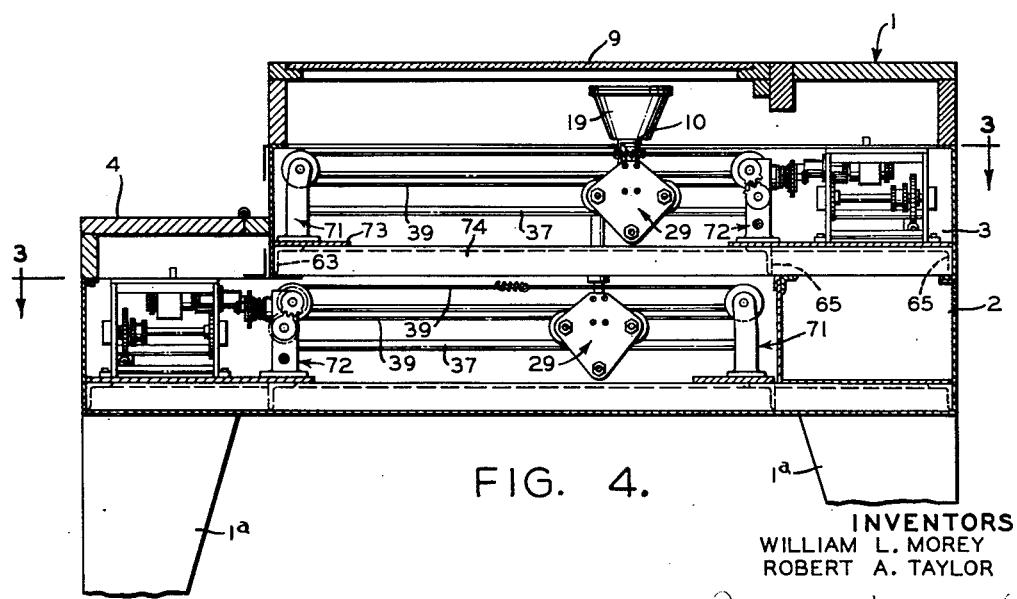
Fig. 4 is a vertical sectional view of the table taken substantially along line 4—4 of Fig. 3.

The mechanism for supporting and moving own ship carriage is contained in the upper section 3 of the housing and will be described in detail. As shown in Figs. 3 and 4, a carriage 10 is provided for indicating own ship. This carriage 10 is shown in detail in Figs. 18 and 19. The carriage 10 comprises an inverted L-shape bracket 11 which has secured within the angle thereof a guide block 12. This block 12 has an inverted V-shaped groove in its lower edge which slidably fits over the similarly shaped upper edge 13 of a bar or track 14. This track 14, as shown in Fig. 3, extends transversely of the table, or in a N-S direction, and is supported in a manner which will be described later. The lower end of the bracket 11 carries a small horizontally disposed roller 15 which will bear against the side surface of bar 14 adjacent the lower edge thereof. The top surface of the bracket 11 is provided with counterweights 11a which will offset the unbalanced weight of bracket 11 and associated parts and minimize the pressure of contact of the roller 15 with the bar 14.

The bracket 11 supports for vertical adjustment a second inverted L-shaped bracket 16, in parallel spaced relationship, by means of the spacer 17 and cooperating screws. The upper horizontal arm of this bracket supports a light housing and reflector 19 which is of annular cross-section. Within this housing there is disposed a bulb 20 which is threaded into a socket 21 that is supported by bracket 18 which is vertically adjustable. The top of the housing 19 is provided with a transparent cover disk 22 which, as shown in Fig. 3, may be calibrated in degrees. A pair of wires 23 lead from the socket 21 to combination screw and spring clip members 24 mounted on an insulating block 25 secured to the lower part of bracket 11. The spring clip of each member 24 slidably engages a wire 26 which extends along the bar 14. Thus, an electric connection is maintained between the bulb 20 and the wire 26 even though the carriage 10 is moved along the bar 14. A second contact of bulb 20 is grounded through bar 24.

As previously indicated, the weight of the carriage 10 is so distributed that it tends to tilt to the right (Fig. 19) so that the roller 15 engages the bar 14. Thus, the carriage will be maintained substantially vertical. The carriage is moved along the bar 14 by means of a wire 27 which extends through the block 12 and which is anchored thereto by means of a screw 28. The wire 27 is in the form of a loop that extends along the upper and lower edges of the bar 14. The loop is maintained taut by a spring (not shown) incorporated therein.

Figure 16:
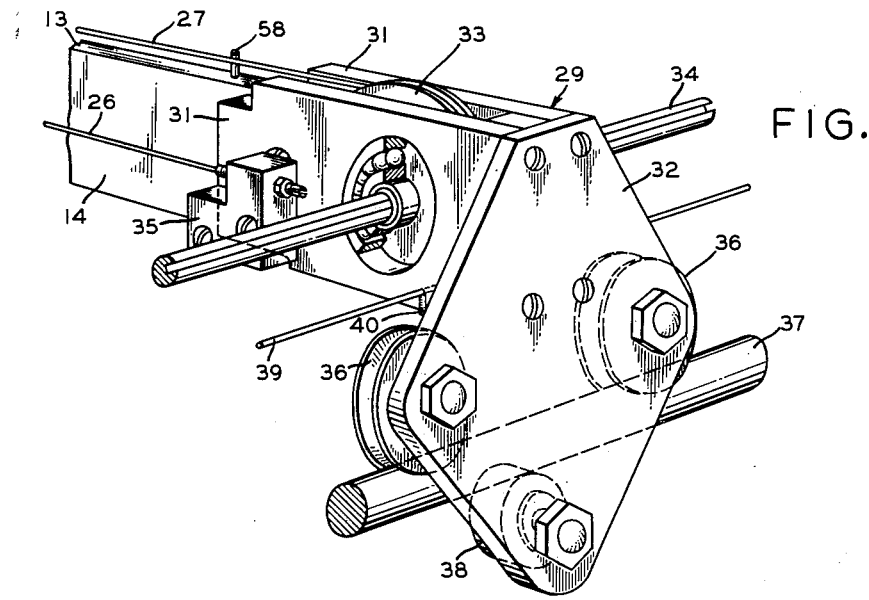
Fig. 16 is a perspective view, partly broken away, of one end of a movable track structure for supporting one of the carriages.
Figure 17:
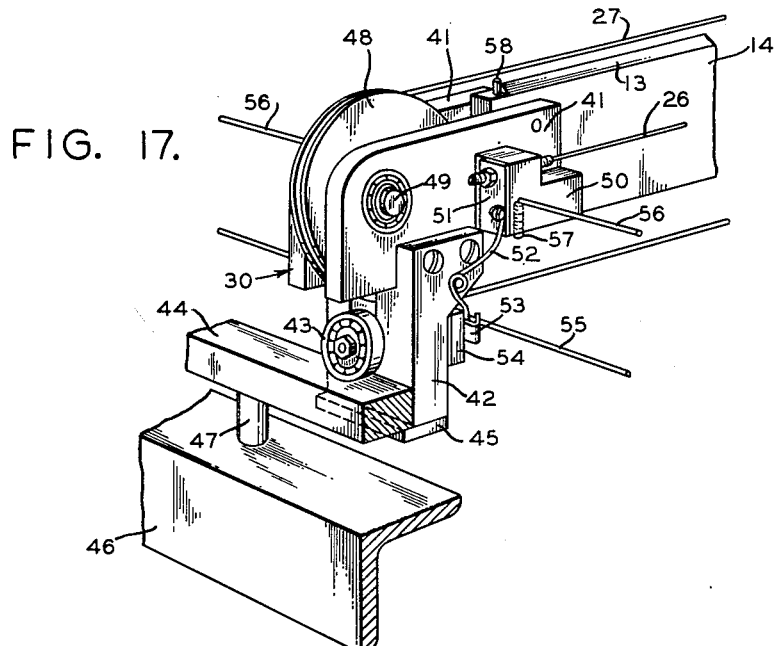
Fig. 17 is a perspective view of the other end of the structure indicated in Fig. 16.
Figure 18:
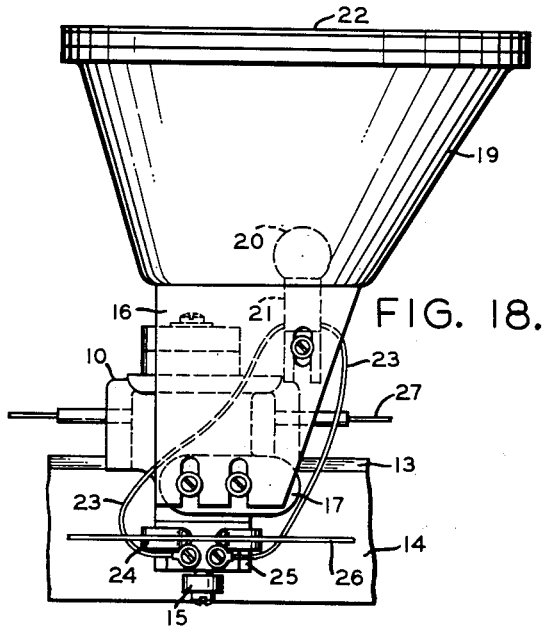
Fig. 18 is a side elevational view of one of the carriages and the light carried thereby.
Figure 19:
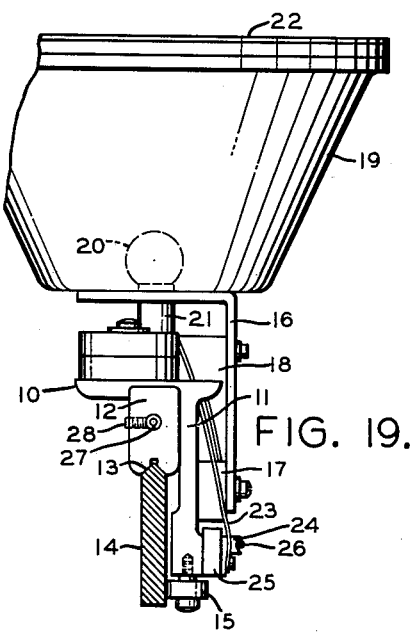
Fig. 19 is an end view of the carriage of Fig. 18.

As indicated in Fig. 16, one end of the bar 14 is carried by a dolly 29. The other end of the bar is supported by a dolly 30 which is shown in Fig. 17. The dolly 29 is at the forward or south side (Fig. 3) of the table while the dolly 30 is at the north side of the table.

The end of the bar 14 which is associated with dolly 29 is secured between a pair of spaced vertically disposed inwardly extending plates 31. These plates have their outer ends secured to a vertically disposed plate 32 that is disposed in a plane at right angles thereto. Between the plates 31 there is rotatably mounted a vertically disposed driving pulley 33 around which the carriage moving wire 27 passes. This pulley 33 is splined on a driving shaft 34 so that it may move axially of the shaft. The shaft 34 extends in an E-W direction or longitudinally of the table and is driven in a manner to be described. The end of the wire 26, which supplies current to the bulb 20, is anchored to an insulating block 35 which is attached to one of the plates 31 of the dolly.

The vertically disposed plate 32 carries a pair of spaced grooved rollers 36 which operate on the rod 37 which extends longitudinally of the table. To maintain the rollers 36 on the rod 37 a third grooved roller 38 is carried by the plate 32 and engages the underneath side of the rod 37. The dolly 29 is moved along the rod 37 by means of a longitudinally extending wire 39 which extends through plates 31 and which is anchored thereto by a screw 40. This wire is in the form of a loop and is maintained taut by a spring 39a incorporated therein.

The dolly 30 (Fig. 17) comprises a pair of spaced vertically disposed inwardly extending plates 41 between which the end of the bar 14 is secured. The plates 41 are carried on the upper end of a bracket 42. The bracket 42 carries a vertically disposed roller 43 which operates on a bar 44 that extends longitudinally of the table. The outer surface of bracket 42 engages the inner edge of the bar 44 and is provided with a lug 45 secured to its lower end which extends beneath the bar 44. The bar 44 is supported on an angle iron 46 by means of spacers 47. The angle iron 46 extends longitudinally and is suitably secured to the side of the housing.

Between the plates 41 a vertically disposed pulley 48 is rotatably mounted. The wire 27, which moves the carriage 10, passes around this idler pulley 48. The pulley 48 is rotatably mounted on a stub-shaft 49 carried by plates 41.

The end of the current-conducting wire 26 is anchored to a block 50 which is secured to one of the plates 41. The block 50 is of insulating material but the wire 26 is in electrical contact with a small plate 51 secured to the end thereof. This plate 51 is electrically connected to a wire clip 52 which is insulated from but carried by bracket 42. Clip 52 is attached to a spring contact 53 that is mounted on the inner surface of bracket 42 by means of an insulating block 54. This spring contact 53 slidably engages a current-carrying wire 55 which extends longitudinally of the table. Thus, an electrical connection is provided between the wire 26 and the wire 55 regardless of the position of the dolly 30 along the track 44. The dolly 30 is moved along the track 44 by means of a longitudinally extending wire 56 which extends through the dolly and is anchored thereto by means of a screw 57. This wire is in the form of a loop which has a spring 56a incorporated therein to maintain it taut. Each end of the bar 14 on its upper edge is provided with an upstanding stop pin 58 which will limit N-S movement of the carriage 10.

As shown best in Fig. 3, the ends of the track 44 are carried by blocks 59 which are suitably secured to the side of the housing. Each of the blocks 59 is provided with a stop 60 with which the bracket 42 of dolly 30 will contact at the end of its movement in either direction longitudinally of the table. The current conducting wire 55 has its ends suitably anchored in the blocks 59.

The wire loop 56 (Fig. 3) is supported by means of bracket units 61 and 62 disposed adjacent the ends of track 44. The unit 61 is supported by means of an angle iron 63 which extends transversely of the housing and is suitably secured to the sides thereof at a level substantially midway of the height of the housing. The bracket 62 is secured to a plate 64 which is disposed at the same level as angle iron 63 and is carried by a pair of transversely extending angle irons 65. This plate 64 is located at the end of the housing in the area below the hinged cover 7 (not shown in Fig. 3 but shown in Fig. 1).

Figure 15:
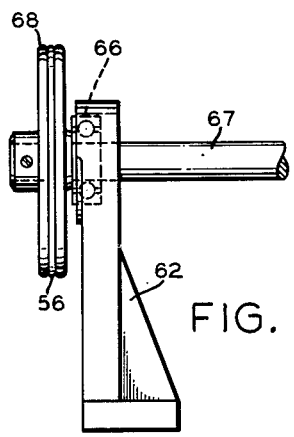
Fig. 15 is an end view of another type of standard which supports a pulley carrying shaft.

The brackets 61 and 62 are of identical structure. The bracket 62 is shown in Fig. 15. It includes a socket for a bearing 66 which is incorporated in its upper end. This bearing 66 receives a transversely extending rotatable drive shaft 67. The end of the shaft 67 has a driving pulley 68 keyed thereon about which the wire loop 56 passes. The bracket 61 carries a stub shaft 69 (Fig. 3) which rotatably supports an idler pulley 70 about which the wire loop 56 passes.

On the opposite side of the machine, bracket units 71 and 72 are provided for supporting the rod 37, upon which the dolly 29 operates, and for supporting other parts which are associated with the dolly. The bracket 71 is carried by a triangular plate 73 which is supported in the corner of the housing by the transverse angle iron 63 and a longitudinal angle iron 74 which is secured to the side of the housing.

Figure 14:
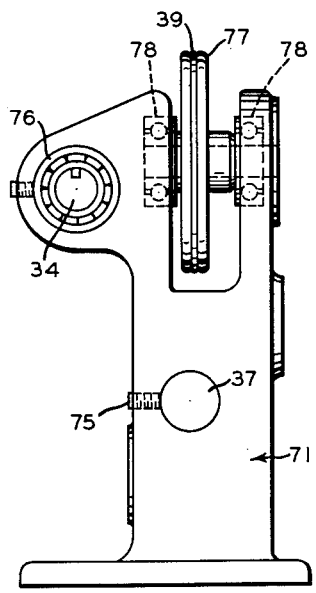
Fig. 14 is an end view of another type of standard which supports a carriage track and part of the mechanism for moving the carriage.

The bracket 71 is shown best in Fig. 14. The lower portion of it is provided with a socket which receives the end of the bar 37, a screw 75 being provided for retaining the bar in position. The bracket is provided at its upper end with an inwardly extending ear in which a bearing 76 is mounted. This bearing receives the rotatable shaft 34. The upper end of the bracket is bifurcated for receiving a vertically disposed idler pulley 77 which is rotatably mounted by means of suitable bearings 78 carried by the bifurcations of the bracket. The wire loop 39 which moves the dolly 29 passes around the pulley 77.

The bracket 72 is carried by the plate 64 adjacent its inner edge and at the side of the housing. This bracket is illustrated best in Figs. 12 and 13. Adjacent its lower end it is provided with a socket for receiving the end of the rod 37 which is retained in the socket by means of a set screw 79. It is provided with an inwardly projecting ear in which a bearing 80 is mounted for rotatably receiving the end of the driving shaft 34. The upper end of the bracket is bifurcated and has a vertically disposed pulley 81 mounted in the bifurcation by suitable means including the bearings 82. The pulley 81 is a driving pulley around which the wire 39, that moves dolly 29, passes. A suitable shaft 83, upon which pulley 81 is keyed, has a pinion 84 keyed on an extension thereof. This pinion 84 meshes with a separate pinion 85 which is keyed on the end of driving shaft 67. The shaft 67 is rotatably mounted in a bearing 86 carried by the bracket 72.

In order to rotate the shaft 67 manually when desired, the shaft is provided with a second pinion 87 keyed thereon on the opposite side thereof. This pinion 87 is adapted to be selectively engaged and disengaged by a pinion 88 which is keyed on the adjacent end of a stub shaft 89. The shaft 89 is slidably mounted in a bearing structure incorporated in the lower part of the bracket 72. This bearing structure includes a bearing collar 90 threaded into the outer end of a socket 91. Within the socket a compression spring 92 is disposed and engages a collar 93 fastened to the shaft 89. The shaft 89 may be forced axially against the pressure of the spring 92 to bring pinion 88 into engagement with pinion 87. A collar 94 attached to shaft 89 will limit this axial movement. A crank 95 is provided on the outer end of shaft 89 for rotating it. Normally the pinion 88 will be maintained out of engagement with pinion 87 by spring 92 and the manual drive unit will be inoperative.

It will be apparent that rotation of the shaft 67 will drive the pulleys 68 and 81. This, in turn, will drive the wires 56 and 39 which will move the dollies 29 and 30 (Fig. 3) and, consequently, the carriage 10 longitudinally of the table.

The shaft 67 is driven by means of mechanism including a friction clutch 96 provided intermediate the ends thereof. This clutch is illustrated best in Fig. 21. A bearing bracket 97 is provided adjacent the clutch for stiffening the shaft. The clutch includes an inner-sleeve 98 keyed to the shaft and which is provided with a peripherial flange 99 at the end thereof. A pinion 100 is rotatably mounted on the sleeve 98 and is pressed against the flange 99 by means of a collar 101 which is slidably mounted on the sleeve 98. A compression spring 102 presses against the collar 101 and maintains it in contact with pinion 100. This spring surrounds the sleeve 98 and its opposite end is in engagement with a collar 103 which is threaded onto the end of the sleeve 98. A driving pinion 104 (Fig. 3) engages the pinion 100. Normally when the pinion 100 is driven it rotates shaft 67, due to the frictional engagement of collar 101 and flange 99 therewith. However, if the dollies 29 and 30 reach the extent of their movement in either direction longitudinally of the table and the pinion 104 continues to drive the pinion 100, the pinion 100 will merely rotate on the sleeve 98 without rotation of shaft 67. Thus, damage to the table mechanism, which might otherwise result, will be precluded by the friction clutch unit 96.

Figures 5, 6:
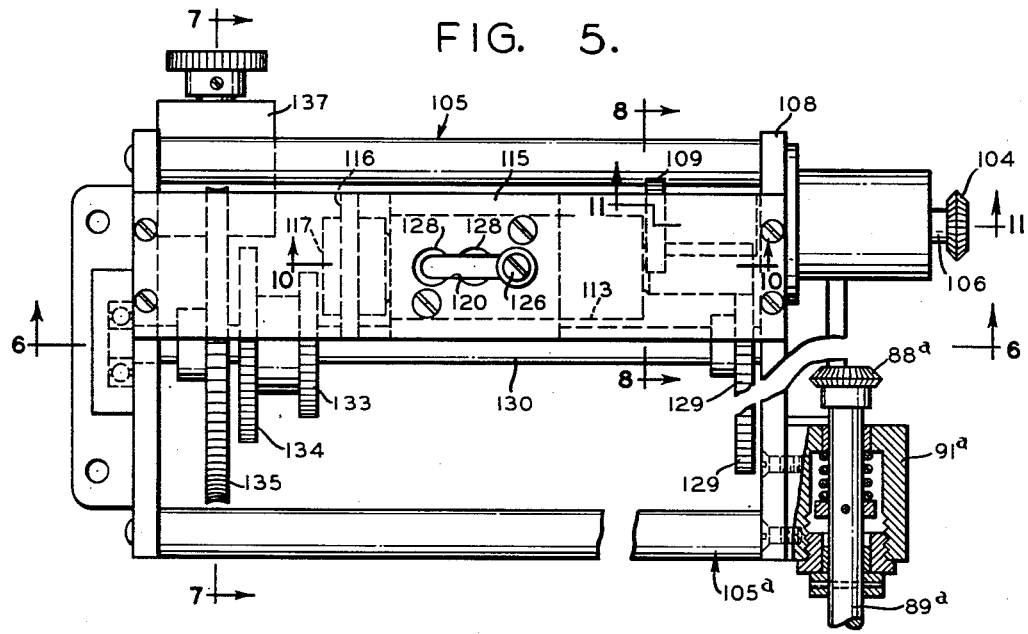
Fig. 5 is a top view, partly broken away, of one of the multi-speed gear units of the table which is part of the mechanism that moves one of the carriages of the table.
Fig. 6 is a vertical sectional view taken substantially along line 6—6 of Fig. 5.
Figure 7:
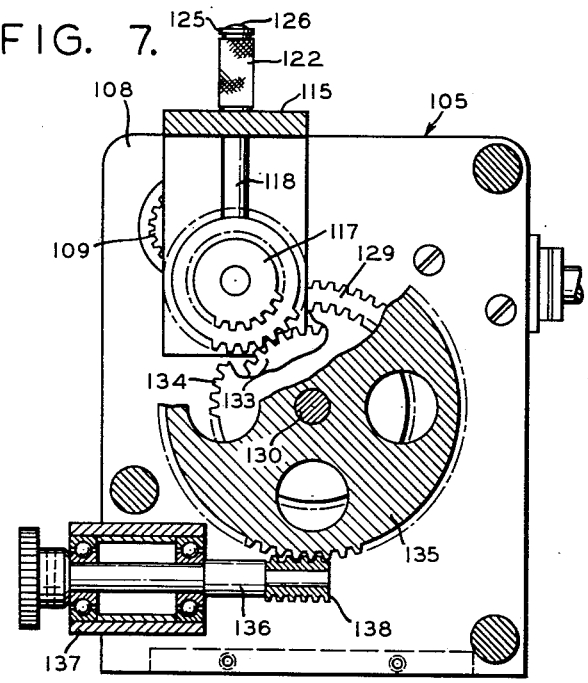
Fig. 7 is a vertical sectional view taken substantially along line 7—7 of Fig. 5.
Figure 8:
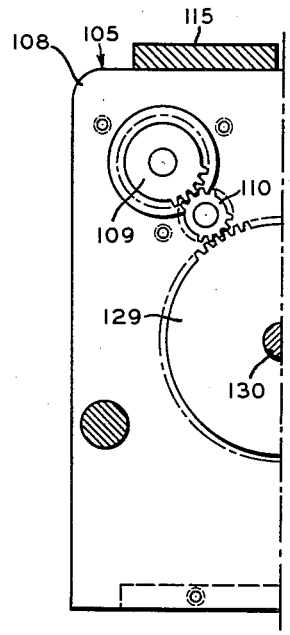
Fig. 8 is a vertical sectional view taken substantially along line 8—8 of Fig. 5.
Figure 9:
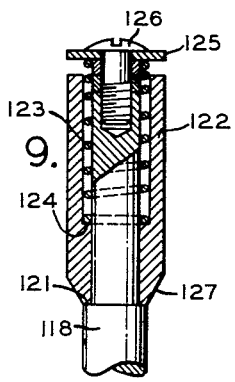
Fig. 9 is a view, mainly in vertical section, of a plunger used in resetting the gears of the unit shown in Fig. 5 to change the speed of movement of the carriage.
Figure 10:
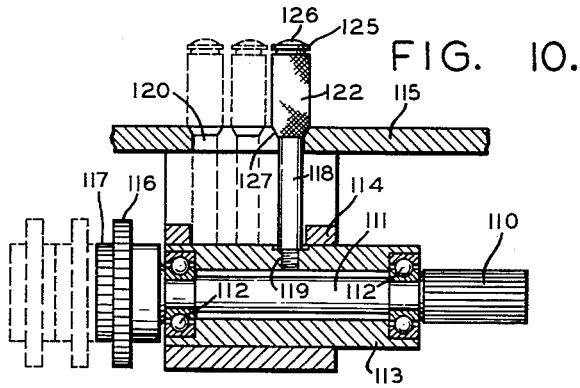
Fig. 10 is a vertical sectional view taken substantially along line 10—10 of Fig. 5.
Figure 11:
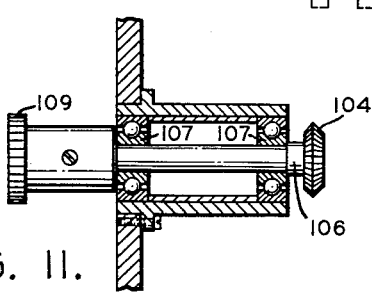
Fig. 11 is a vertical sectional view taken substantially along line 11—11 of Fig. 5.
Figure 12:
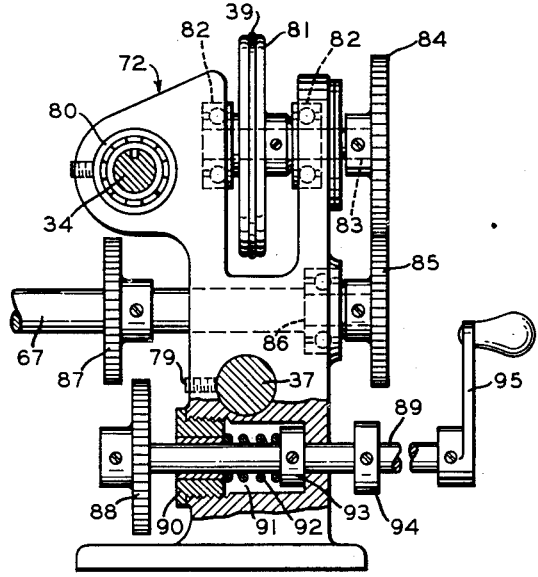
Fig. 12 is an end elevational view, partly broken away, of one of the standards which supports a carriage track and part of the mechanism for moving the carriage.
Figure 13:
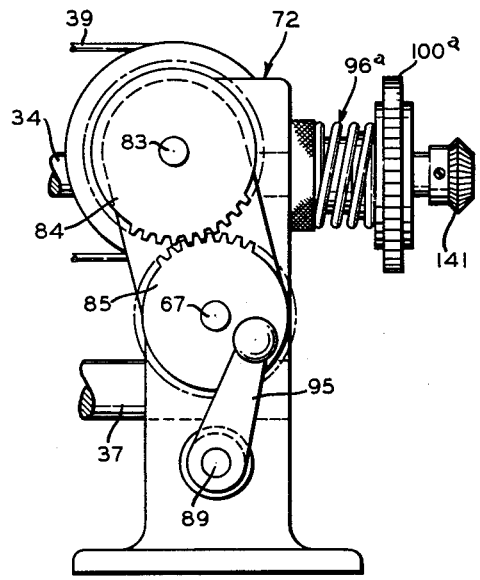
Fig. 13 is a side elevational view of the standard of Fig. 12.

The gear unit 105 (Fig. 3), which drives the pinion 104, is of the multi-speed type and is illustrated best in Figs. 5 to 11. The pinion 104 is keyed on the outer end of a stub shaft 106. This shaft 106 is rotatably carried in bearings 107 (Fig. 11) supported on one end of a frame 108 at the upper end thereof. This frame is carried by the plate 64. The inner end of the shaft 106 has a pinion 109 keyed thereon. This pinion 109 continuously meshes with an elongated pinion 110 (Fig. 6). The pinion 110 is keyed on one end of a short shaft 111 (Fig. 10) which is carried by bearings 112 in a sleeve 113. The sleeve 113 is axially movable in a bearing 114 which is carried by the top bar 115 of the frame 108. The opposite end of the shaft 111 has keyed thereon a double pinion unit consiting of a pinion 116 and a similar pinion 117.

The sleeve 113 is moved axially of bearing 114 by means of an upstanding pin 118 which has its lower end threaded into the sleeve, as at 119. This pin 118 extends upwardly through an elongated slot 120 formed in bar 115. This arrangement will prevent rotation of sleeve 113 with the shaft 111. The upper portion of the pin 118 is reduced and provides a shoulder 121 spaced from the upper end thereof. The sleeve 122 is mounted on the reduced portion and is vertically movable thereon. This sleeve is normally maintained in its lowermost position against shoulder 121 by means of a compression spring 123 which is disposed in a socket formed therein that provides a shoulder 124 against which the lower end of the spring abuts. The upper end of the spring abuts against a washer 125 which is held in position on the upper end of the pin by means of a screw 126 threaded into the pin. The exterior of the lower end of the sleeve 122 is shaped to provide a conical surface 127.

As shown best in Fig. 5, the slot 120 is provided with three spaced countersunk sockets 128 along its length. The lower conical end 127 of the sleeve 122 can be selectively inserted in any of these openings. To move the pin 118 to its various positions, it is merely necessary to pull the sleeve 122 upwardly against the force of spring 123 to remove the conical end 127 from the socket 128 in which it is disposed. As soon as the pin is moved into another socket 128, the sleeve 122 will be released and the conical end 127 will be forced into the socket 128 by expansion of spring 123. Thus, the sleeve 113 and the shaft 111 carried thereby may be moved longitudinally and locked in any of three positions.

The pinion 110 engages a larger gear 129 which is keyed on a shaft 130. This shaft 130 is rotatably mounted in bearings 131 and 132 provided at the ends of the frame 108. The end of the shaft 130, adjacent the pinion unit 116—117 has a double pinion unit keyed thereon which consists of a smaller pinion 133 and a larger pinion 134. This end of the shaft also has keyed thereon a larger worm gear 135. This worm gear 135 meshes with a worm shaft 136 which is mounted in a bearing 137 attached to the end of the frame at the lower part thereof. The worm shaft 136 (Fig. 7) has a driving pinion 138 keyed on the outer end thereof.

With the pin 118 at the right-hand end (Fig. 6) of the slot 120, the pinion 104, which drives shaft 67, will be driven by the pinion 138 through the medium of worm shaft 136, worm gear 135, shaft 130, gear 129, elongated pinion 110, pinion 109, and shaft 106. With the pin 118 in the next position to the left, the pinion 104 will be driven by pinion 138 through the medium of shaft 136, gear 135, pinion 133, pinion 116, shaft 111, elongated pinion 110, pinion 109, and shaft 106. In this position of pin 118, the elongated pinion 110 will be out of engagement with the gear 129. With the pin 118 moved to the extreme left hand end of slot 120, the pinion 104 will be driven by pinion 138 through the medium of shaft 136, gear 135, pinion 134, pinion 117, shaft 111, elongated pinion 110, pinion 109, and shaft 106. At this time also the elongated pinion 110 will be out of engagement with the pinion 129. Thus, the gear unit 105 may be adjusted to select any of three driving speeds for the pinion 104 which drives the shaft 67. Consequently, the carriage 10 may be moved longitudinally of the table at any of three selected speeds.

The pinion 138 is driven by a pinion 139 (Fig. 3) on the end of the drive shaft of a motor 140. This motor is a reversible electric motor of the step type and electric impulses are supplied thereto in a manner to be described subsequently.

As previously indicated, the shaft 34 is adapted to be driven in order to rotate the pulley 33 and thereby cause the wire 27 to move the carriage 10 along the bar 14 or transversely of the table. As shown best in Fig. 13, the shaft 34 continues through the bracket 72 and has a pinion 141 keyed on the outer end thereof. Also associated with this end of the shaft is a clutch unit 96a which is identical with the clutch 96 of Fig. 21 and which includes a gear 100a. The gear 100a is driven by means of a pinion 104a of a multi-speed gear unit 105a which is identical with the unit 105 previously described. The unit 105a is driven by a reversible step type electric motor 140a to which impulses are supplied in a manner to be described. Thus, the shaft 34 will be driven through a drive including the clutch 96a. Rotation of the shaft 34 will produce rotation of the pulley 33 which will drive the belt 27 and move the carriage 10 transversely of the table along the bar 14. When the carriage 10 reaches the extent of its movement in either direction, the clutch 96a will slip and will prevent further rotation of the shaft 34.

As shown in Figs. 3 and 5a, the unit 105a has associated therewith means for manually rotating the shaft 34 when desired. This means comprises a manually operable clutch unit of the type previously described with reference to Fig. 12. It includes a crank handle 95a which is adapted to rotate a shaft 89a that is axially movable in a housing 91a which may be bolted to the end of a unit 105a. The shaft carries a pinion 88a which may be moved into and out of engagement with the pinion 141 carried by the shaft 34.

Thus, it will be apparent that when the motor 140 is energized, the carriage 10 will be moved in a N or S direction. When the motor 140a is energized, the carriage 10 will be moved in an E or W direction. If both the motors are energized simultaneously, movement will be in a direction which is a component of the N-S and E-W directions.

Figure 20:
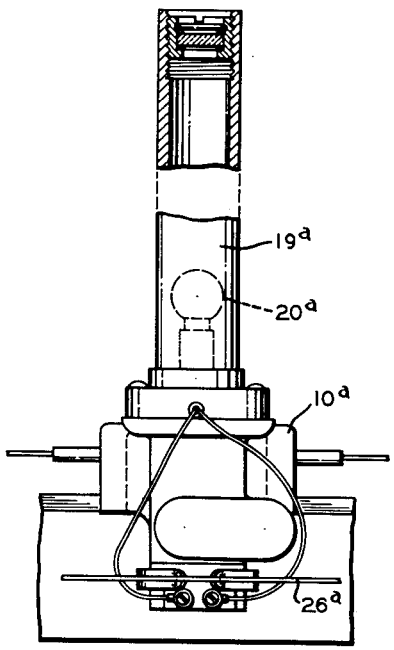
Fig. 20 is a side elevational view, partly broken away, of the other carriage.
Figure 21:
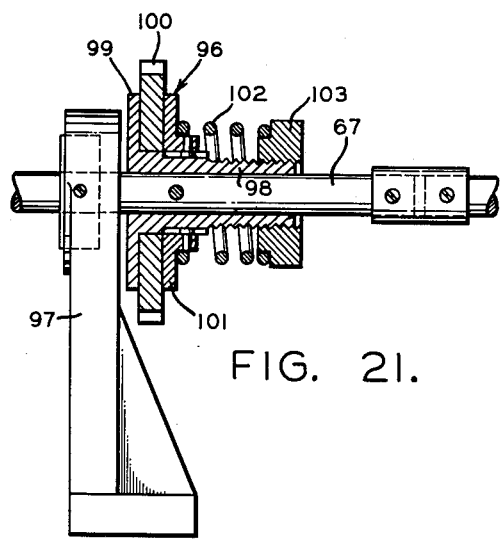
Fig. 21 is a view, mainly in section, of an automatic clutch which forms part of the mechanism for moving one of the carriages.

The mechanism for supporting and moving the enemy ship carriage is contained in the lower section 2 of the housing. This mechanism is identical with the mechanism for supporting and moving the carriage 10 and will, therefore, not be described in detail. The carriage 10a of this mechanism is slightly different from the carriage 10 and is shown in Fig. 20. Instead of the large diameter light housing 19, we provide a small diameter tubular housing 19a in which a bulb 20a is disposed. Thus, a small image will be projected on the translucent plate 9 and may be positioned within the area of the image of the disk 22 when the images of the two imaginary ships approach each other closely on the plate 9.

The carriage 10a is moved in an E-W direction by means of a reversible step motor 140b. The carriage 10a is moved in a N-S direction by means of a reversible step motor 140c. Adjacent the motor 140b, a control panel is provided which carries a switch 142 for controlling the circuit to the light 20 carried by carriage 10 and a switch 142a for controlling the circuit to the light 20a carried by the carriage 10a. The panel also carries a rheostat 144 which controls the intensity of the light 20.

Figure 22:
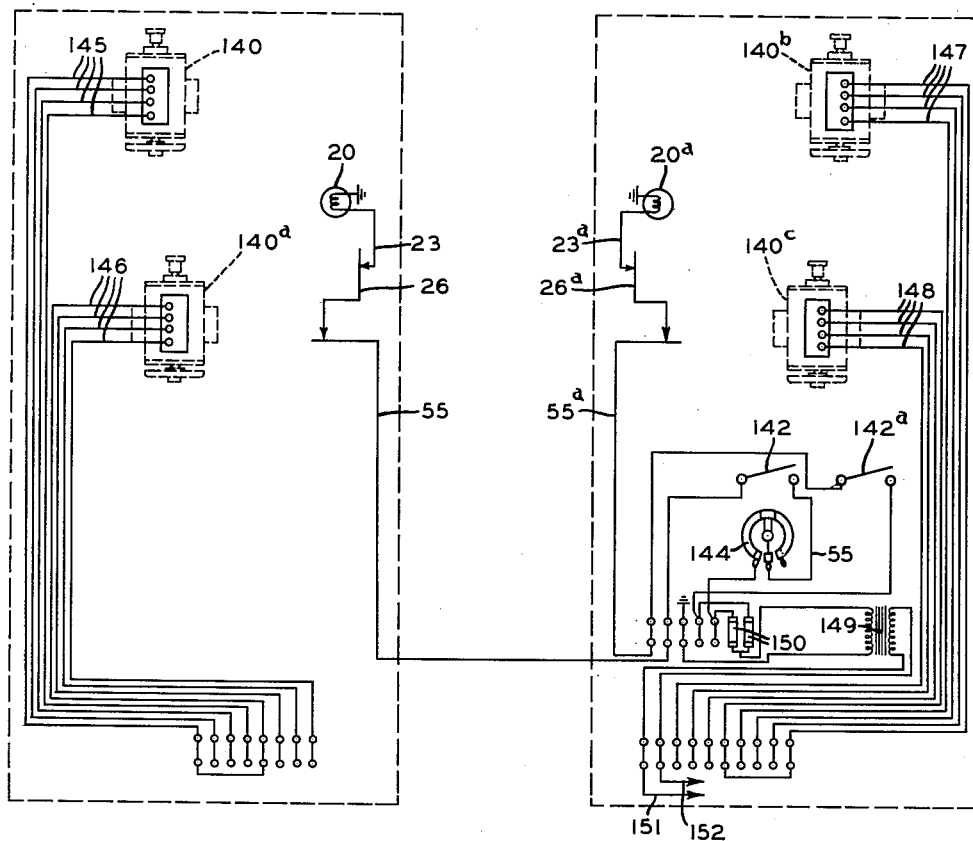
Fig. 22 is a diagram of the electrical wiring of the table.

In Fig. 22, we have illustrated the electric circuit for our table. The circuit for the top part of the table is illustrated at the left while the circuit for the bottom part of the table is indicated at the right. The circuit for the top part of the table includes four lines 145 which connect to the motor 140 and four lines 146 which connect to the motor 140a. The wires 23 for the bulb 20 are shown connected to the line 26 by a sliding contact which was previously described. The line 26 is connected by a sliding contact, previously described, to the line 55. The line 55 has the switch 142 incorporated therein. The circuit for the bottom part of the table is similar to that of the top part and includes the four lines 147 which are connected to the motor 140b and the four lines 148 which are connected to the motor 140c. The bulb 20a of the carriage 10a is connected to lines 23a which are connected to line 26a by a sliding contact. The line 26a is connected by a sliding contact to the line 55a. The line 55a has the switch 142a incorporated therein. The rheostat 144 is incorporated in the line 55, as shown. A transformer 149 and a pair of fuses 150 are also associated with the circuit, as shown. The leads 151 and 152 which lead into the transformer 149 are connected to a suitable source of A. C. current. The groups 145, 146, 147, 148 of four lines each are connected to an analyzer which supplies the necessary electric impulses to the various lines for operating the various motors 140, 140a, 140b and 140c.

Figure 23:
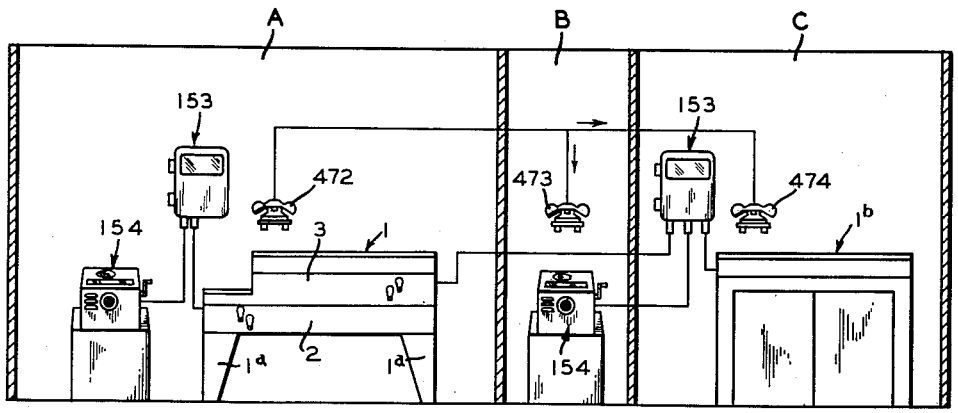
Fig. 23 is a diagrammatic view of a suggested layout for use of my apparatus in a CIC school.

The analyzer will be disposed in a suitable housing and is indicated generally by the numeral 153 in Fig. 23 which illustrates one installation of my apparatus. One of these analyzers will be disposed in an electric circuit between each of the control units indicated generally by the numeral 154 and the portion of the table 1 which the control unit controls. One of the control units 154 will be provided for actuating the upper portion of the table which indicates own ship course. Thus, one control unit will supply electric impulses to the motors 140 and 140a. A second control unit 154 will be provided for operating the lower or enemy ship course indicating portion of the table. Thus, this control unit will supply electric impulses to the motors 140b and 140c. The electric impulses for operating all of the motors will be created by the control units, in a manner which will be described in detail hereinafter, and will be supplied to the motors through analyzer units 153 as will be described later more in detail.

The analyzer unit 153 does not form a part of our invention but is of a type now commonly used on all U. S. Navy ships equipped with dead reckoning equipment. The analyzer is known as the ARMA Dead Reckoning System and is manufactured by the ARMA Corporation, 254 Thirty-sixth Street, Brooklyn, New York. On board ship this system receives the course and distance inputs and resolves them, mechanically, into the N-S and E-W components of the ship's travel. This course and distance information is supplied to the analyzer aboard ship in the form of electric impulses from the ship's gyro compass and underwater log. However, with the apparatus of our invention, the course and distance inputs to the analyzer will be supplied by one of the control units 154 rather than by a gyro compass and underwater log. Our control unit 154 is illustrated in detail in Figs. 24 to 51 inclusive. Since the control unit is intricate, it is believed desirable to describe it generally and to outline its general operation by reference to the schematic functional diagram in Fig. 50 before describing the details of the mechanism. By the term "selsyn" used in the following description we mean a self-synchronous electric motor or generator.

Figure 50:
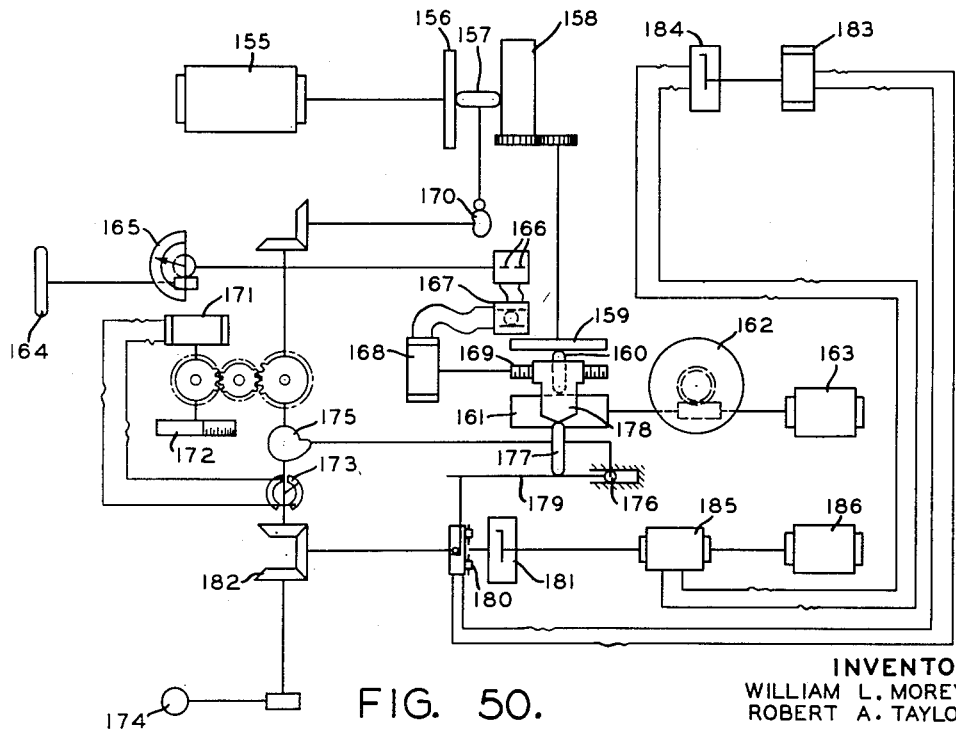
Fig. 50 is a schematic illustration of the control unit.

The main units of the mechanism are illustrated schematically in Fig. 50. They include a constant speed motor 155 which drives, at a constant speed, an integrator disk 156. This disk 156 engages an integrator roller 157 which engages a cylindrical member 158. The member 158 drives an integrator disk 159. The disk 159 engages a roller 160 which engages a cylindrical driving member 161. The member 161 actuates a true bearing dial 162 that is carried by a selsyn and also actuates the course selsyn 163. A handwheel 164 which simulates the helm of a vessel is provided and actuates a rudder angle indicator 165 which, in turn, controls the slidable rudder position contacts 166. These contacts 166 control a time delay switch 167 which controls a reversible motor 168. The motor 168 rotates a screw 169 which moves the roller 160 radially of the integrator disk 159 and axially of cylinder 161.

The roller 157 is moved axially of cylinder 158 and radially of integrator disk 156 by means of a rotatable cam 170. The cam 170 is rotated by means of a reversible electric motor 171 which also serves to drive a rotatable speed indicating dial 172. The motor 171 is controlled by a split ring switch 173, the pointer of which may be rocked by the handle 174 through the medium of a connection including gears 182. A plunger 177 is associated with the surface of a wedge block 178. This block 178 carries the roller 160, previously mentioned, and is moved laterally by the screw 169. The lateral movement of the block 178 produces axial movement of the plunger 177 which will control swinging of a lever 179 about a sliding pivot 176. The lever 179 positions tachometer contacts 180 of the tachometer 181. A cam 175 controls the lateral position of the pivot 176 for lever 179 and is rotated through the medium of the differential gears 182 which may be actuated by handle 174. The contacts 180 control a reversible motor 183. This motor 183 rotates the contact arm of a rheostate 184 which controls a D. C. drive motor 185. The pointer of tachometer 181 is moved by the motor 185. The motor 185 also operates the distance selsyn 186.

Following is an outline of the operation of the control unit under two basic assumptions: First, change the position of handle 174 only for control of the ship's speed; and second, change the position of helm 164 only to change the rudder angle.

Under starting conditions with the rudder amidships and the ship dead in the water, the operator advances the handle 174 until the selected speed is indicated by the dial 172. The rudder remains unchanged. The sequence of the control unit's performance will be as follows: Advancing the handle 174 translates motion through differential gears 182, thereby positioning tachometer contacts 180 in such a manner as to energize motor 183 which, in turn, drives the center contact arm of rheostat 184. Thus, a flow of electric energy to the armature of the D. C. motor 185 is controlled and this motor drives distance selsyn 186 and also tachometer 181. The distance selsyn 186 rotates at a speed proportional to the setting of the center contact arm in the rheostat 184, thus, providing speed input to the analyzer unit 153 (Fig. 23) to which the control unit may be connected. The D. C. drive motor 185 positions the pointer of the tachometer 181 with respect to the tachometer contacts 180 until such time as magnetic balance is established between pointer and contacts, thus stopping motor 183 and allowing the center contact arm of the rheostat 184 to remain stationary.

Consequently, selsyn 186 will give a constant speed input to the analyzer unit 153 which is proportional to the indication on the speed dial 172.

Advancing the handle 174 also changes the position of the pointer in the split ring 173, thus energizing the motor 171 which drives the speed dial 172 and cam 170. The cam 170 moves roller 157 off the center of the integrator disk 156, causing the cylinder 158 to be driven and to drive the integrator disk 159 but since the rudder remains amidships, roller 160 will remain at the center of disk 159 and will not be rotated. The motor 171 will drive until such time as the pointer of split ring switch 173 is moved to a position where the circuit to the motor is broken.

The rate of acceleration of the speed of the ship from 0 up to the speed selected is determined by the gear ratios of motors 171 and 183.

Under starting conditions with the rudder amidships and the handle 174 positioned to give the previously selected speed, the helm 164 is turned until a selected rudder angle is reached which will be shown by indicator 165. The sequence of the control unit's performance will now be as follows: Advancing the helm 164 positions the contacts 166 so that the time delay switch 167 is energized. After a short delay, the switch 167 energizes the motor 168 which rotates screw 169. The screw 169 moves the wedge block 178 laterally and, consequently, moves the roller 160 off center of integrator disk 159. The roller 160, consequently, drives the cylinder 161 which, in turn, drives both the selsyn that carries dial 162 and the course selsyn 163 which supplies the course input to the analyzer unit 153 (Fig. 23). The dial 162 will indicate true bearing at any instant, thus, indicating the rate of change of the ship's heading.

The time taken for the motor 168 to move roller 160 to the extent determined by rudder position contacts 166, determines the acceleration in the rate of change in the ship's heading up to the point where it reaches its turning circle when the motor 168 stops and the rate of change of the ship's heading becomes constant.

Advancing the helm 164 causes the wedge block 178 to move laterally, in the manner described above. The plunger 177 in following the V face of the wedge block allows the lever 179 to move, angularly, the tachometer contacts 180 thereby relocating the point of magnetic equilibrium of tachometer 181, with resulting speed decay in the speed output of distance selsyn 186. Repositioning tachometer contacts 180 also impresses a torque on differential gears 182 with a resulting reduction of the speed indication on dial 172. Speed decay in the turning circle of the ship is conditioned by the position of the pivot point 176 of lever 179 which will be changed laterally by rocking of the cam 175. Thus, for each selected speed, change of the helm 164 involves different resultant speed decay.

Various other combinations of conditions of operation will occur and the control unit's performance under such conditions will be apparent from the above description.

Figure 24:
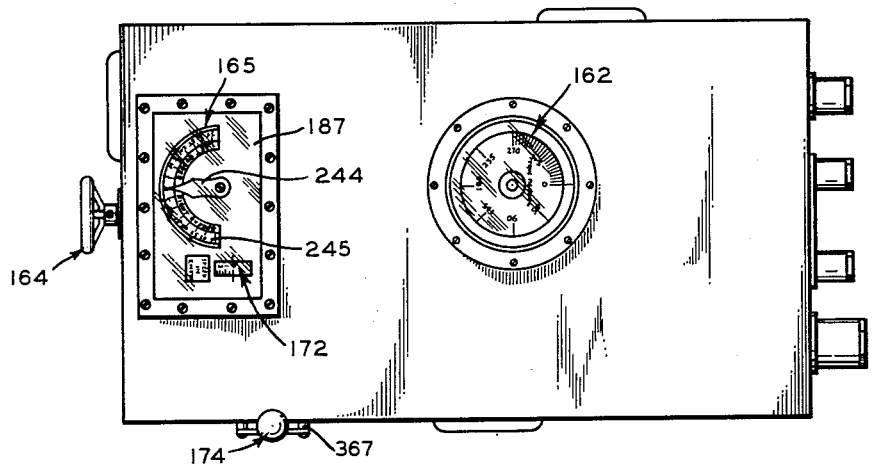
Fig. 24 is a plan view of the housing of the control unit of my apparatus.
Figure 25:
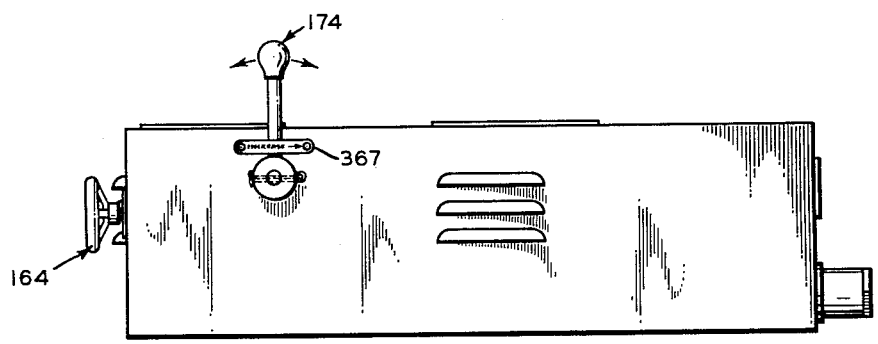
Fig. 25 is a side elevational view of the housing of the control unit shown in Fig. 24.
Figure 26:
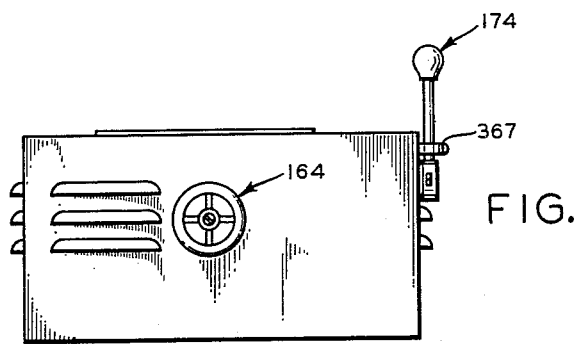
Fig. 26 is an end view of the housing of the control unit shown in Fig. 24.

The mechanism of the control unit is disposed in the housing indicated in Figs. 24, 25, and 26. The helm control handwheel 164 is disposed at one end of the housing. The speed control lever 174 is disposed at one side of the housing and close to the handwheel 164. The rudder indicator 165 is disposed beneath a glass panel 187 secured to the top of the housing adjacent the end where the handwheel 164 is disposed. This panel 187 also has beneath it the speed indicating dial 172. The true bearing dial 162 is also disposed beneath a glass plate mounted in the top of the housing.

Figure 27:
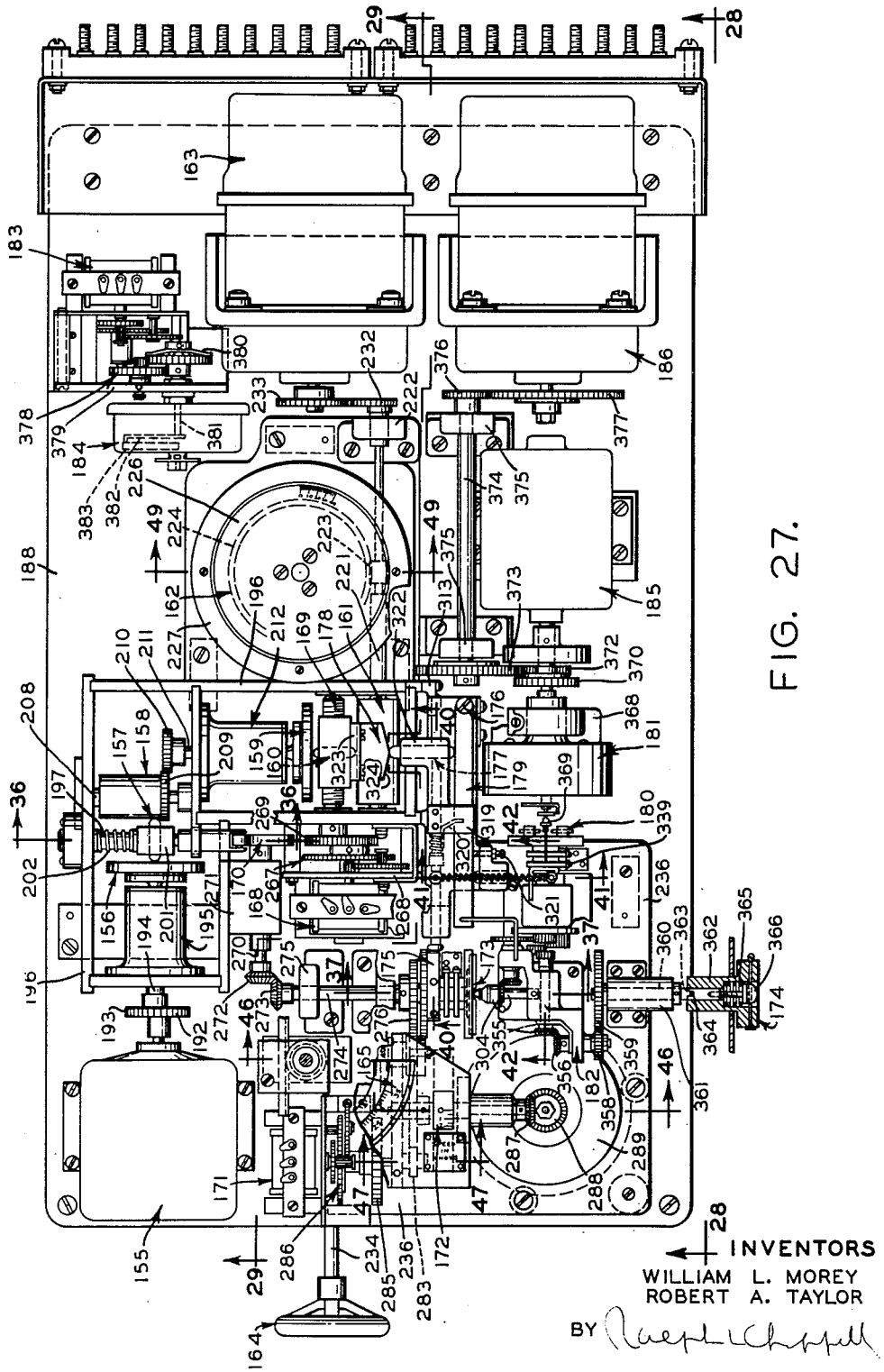
Fig. 27 is a top view of the mechanism of the control unit.
Figure 28:
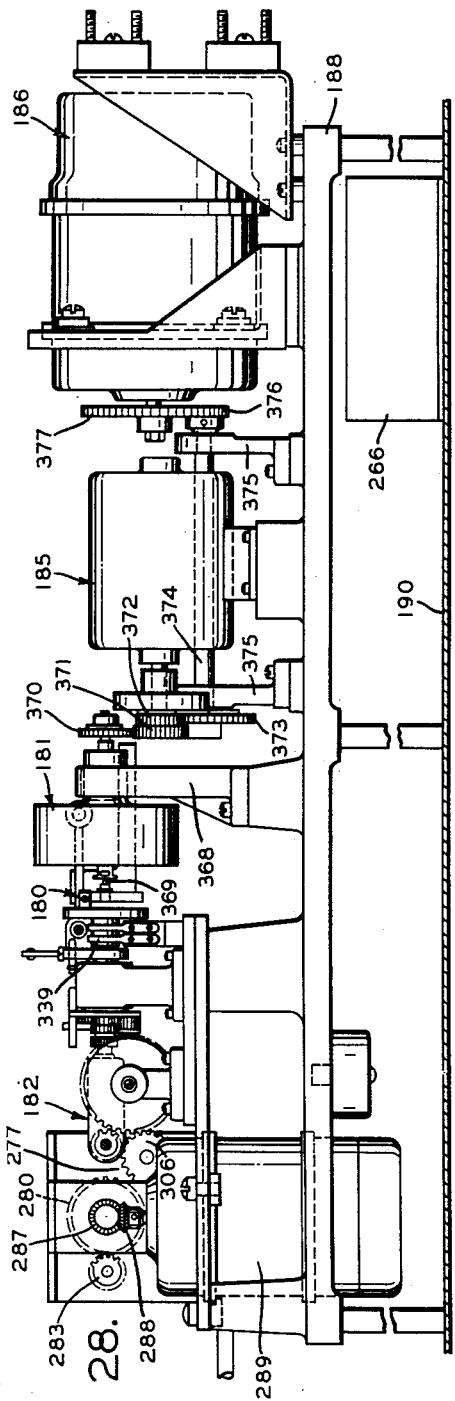
Fig. 28 is a view of one side of the mechanism of Fig. 27 taken along line 28—28 of Fig. 27.
Figure 29:
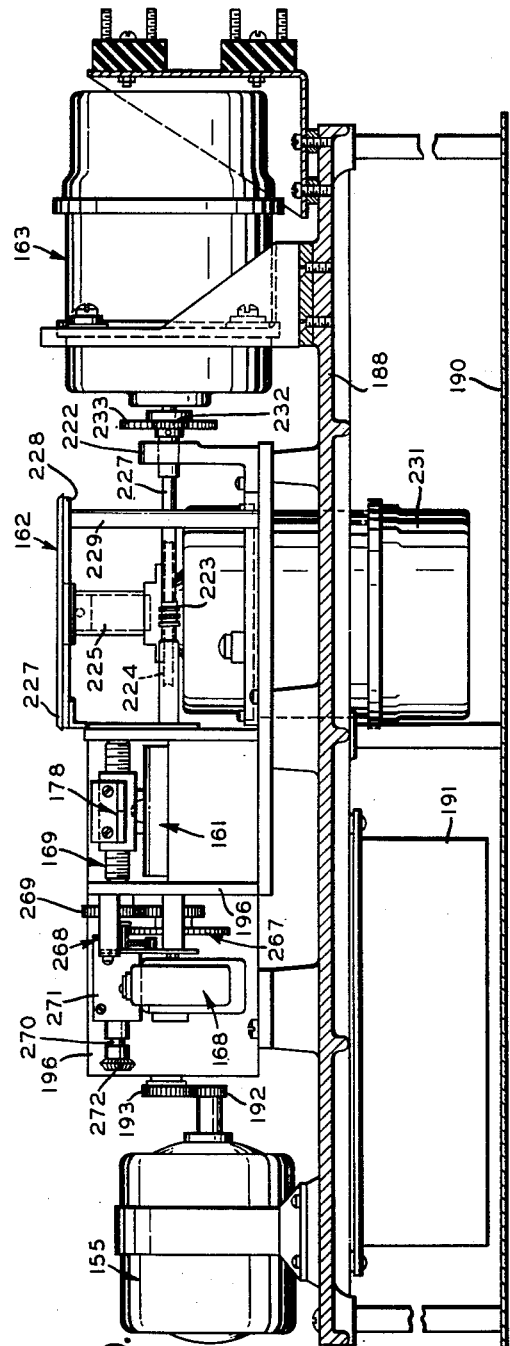
Fig. 29 is a vertical sectional view taken along line 29—29 of Fig. 27.
Figure 34:
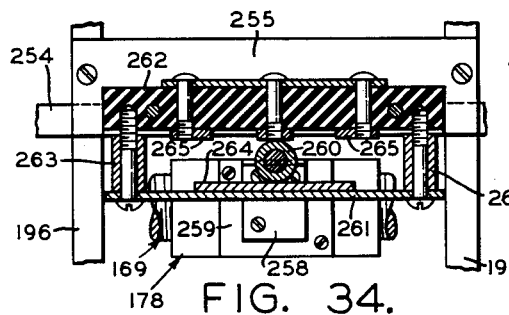
Fig. 34 is a horizontal sectional view taken along line 34—34 of Fig. 33.

The control mechanism disposed within the housing is all carried by a base plate 188 as shown best in Figs. 27, 28, and 29. This base plate has secured to it in spaced relationship, by means of spacers 189, the lower wall 190 of the housing. Within the space between the base plate 188 and wall 190 there is disposed a box 191 which is adapted to contain most of the electric system and wiring of the control unit. Also, as shown in Figs. 28 and 29 certain other units of the control mechanism extend down into the space between the plate 188 and wall 190.

The constant speed motor 155, as shown in Fig. 27, is disposed at one corner of the base plate 188. The drive shaft of this motor drives a pinion 192 which engages a pinion 193. The pinion 193 is keyed on the end of a shaft 194 which is associated with a plunger unit 195. The opposite end of the shaft 194 has the integrator disk 156 keyed thereon. This disk, consequently, is driven at a constant speed by the motor 155. The unit 195 is carried by the frame 196 which is suitably secured to the based plate 188.

Also carried by the frame 196 adjacent the integrator disk 156 is the integrator roller 157. The mounting for this roller is indicated best in Figs. 27 and 36. It includes a rod 197 which extends at right angles to the axis of the unit 195. This rod is slidably and non-rotatably carried by bearings 198 and 199 carried by portions of the frame 196. The portion of the rod which slides in bearing 199 is enlarged so that there is provided a shoulder 200. A roller supporting bracket 201 has its upper sleeve-like portion splined on the reduced portion of the rod 197. A compression spring 202 is disposed on the reduced portion of the rod 197 and bears against the bracket 201 forcing it against the shoulder 200. The opposite end of the spring is disposed within a socket 203 formed in the bearing 198.

The bracket 201 is provided with a depending bifurcated portion 204 in which the roller 157 is mounted. The roller is carried by a pin 205 which is disposed in roller bearings 206 which are carried by the bifurcations. The enlarged end of the rod 197 carries the vertically disposed cam follower roller 207 which is in constant engagement with the cam 170. It will be apparent that the spring 202 will force the rod 197 to the right (Fig. 36) so that the roller 207 will always be in contact with the cam 170. Rotation of the cam 170 will serve to move the rod 197 longitudinally, against the force of spring 202, and will, thereby, move the roller 157 radially of the disk 156. Thus, when the roller 157 is moved away from the center of the disk 156, the roller will be rotated by the disk. However with the roller 157 at the center of disk 156, the roller will not be driven by the constantly rotating disk. The disk 156 will always be pressed into engagement with the roller 157 by means of the unit 195 in a manner which will be hereinafter apparent.

As shown in Fig. 27, the roller 157 engages the cylinder 158. This cylinder is carried by a shaft 208 which is mounted in bearings carried by the frame 196. A pinion 209 is disposed at one end of the cylinder 158 and rotates therewith. Thus, rotation of the roller 157 will drive the cylinder 158. Movement of the roller 157 radially of the disk 156 will also move it axially of the cylinder 158 but the roller will be maintained in driving contact with the cylinder. The pinion 209 drives the pinion 210 which is keyed on the outer end of a shaft 211 that forms a part of a plunger unit 212.

The unit 212 serves to drive the integrator disk 159 and to maintain the integrator disk 159 in contact with the roller 160. The unit 212 is exactly the same as the unit 195 and is illustrated in detail in Fig. 33. It comprises a housing in the form of a sleeve 213 that has a peripheral flange 214 on its one end which is bolted to the frame 196. The sleeve 213 has the shaft 211, that carries pinion 210, mounted therein for rotation and axial movement by means of the ball bearings 215. The shaft 211 has a peripheral flange 216 formed on its end onto which the disk 159 is secured. A compression spring 217 is disposed in surrounding relationship to the shaft 211. One end of the spring abuts a collar 218 that bears against one of the bearings 215 while the other end abuts a collar 219 which is pinned to the shaft 211. Thus, the spring 217 will tend to force the shaft 211 to the right (Fig. 33) and will thereby cause the disk 159 to firmly contact with the roller 160.

The roller 160 as shown in Figs. 27 and 33, is carried by the wedge carrying block 178. This block has the screw 169 threaded through the upper portion thereof, as shown in Figs. 27, 29, and 33. The block is provided with a depending bifurcated portion 220 in which the roller 160 is rotatably mounted in the same manner that roller 157 (Fig. 36) is carried by the bracket 201.

The roller 160 engages the cylinder 161 which is disposed at right angles to the axis of rotation of disk 159. This cylinder 161 is carried by a shaft 221 which is supported by frame 196. As will later appear, the screw 169 will serve to move the block 178 and the roller 160 carried thereby radially of the disk 159. The roller 160 will, consequently, be also moved axially of the cylinder 161 but will always be in contact therewith.

Figure 49:
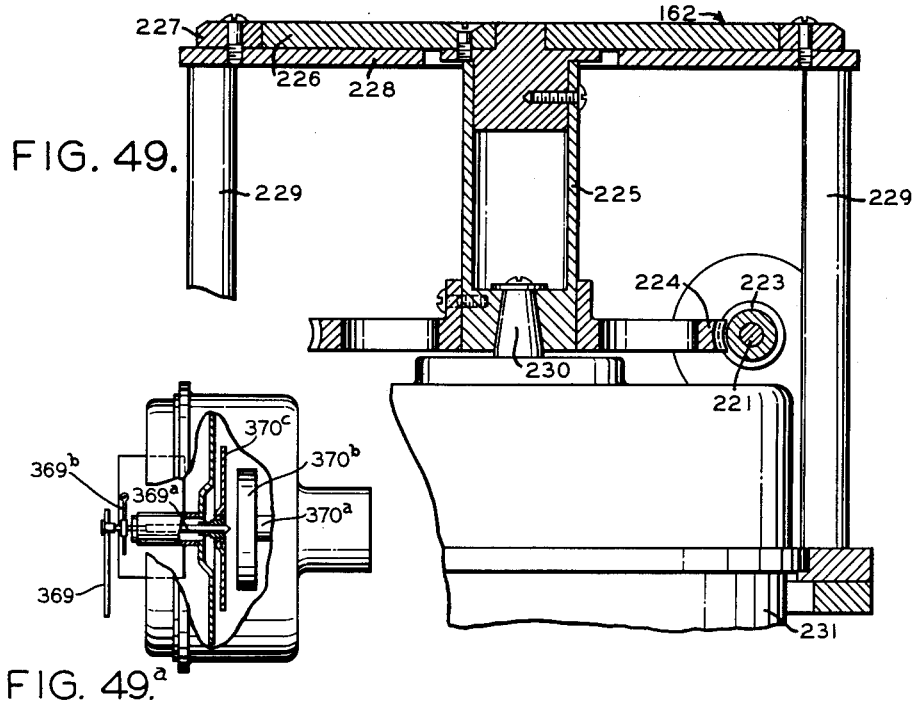
Fig. 49 is a vertical sectional view taken along line 49—49 of Fig. 27.

As shown in Figs. 27, 29, and 49, the shaft 221 operates the true bearing indicator 162. The shaft 221 extends from the cylinder 161 a considerable distance and its outer end is carried by a bearing bracket 222 which is secured to the frame 196. The shaft is provided with a worm 223 which meshes with a horizontal worm gear 224. This gear 224 is carried by a vertical sleeve 225 (Fig. 49) which projects up through the top of the control unit housing and carries a dial 226. The dial 226 is suitably calibrated and will cooperate with a surrounding ring 227 which is carried by a plate 228 on the top of the housing. This plate 228 is supported by the standards 229 which have their lower ends attached to the frame 196. The lower end of the sleeve 225 is carried by the projecting shaft 230 of a selsyn 231. The selsyn 231 is vertically disposed and extends downwardly through the base plate 188 which carries it (Fig. 29). Thus, it will be apparent that the shaft 221 will serve to operate the true bearing indicator 162.

It is not necessary to provide the selsyn 231 as part of our control unit. It can be provided, however, if desired, for serving as a generator for actuating an identical selsyn to control a duplicate of the course indicator 162 at a point remote from the control unit.

As shown in Figs. 27 and 29, the end of the shaft 221 projects through bearing bracket 222 and has a pinion 232 keyed thereon. This pinion 232 engages a pinion 233 carried by the shaft of the selsyn 163. The selsyn 163 is carried by the base plate 188 and is horizontally disposed. This selsyn, as previously indicated, is the course input for the analyzer.

The helm control 164 and rudder angle indicator are illustrated best in Figs. 27, 30, 31, and 32. The handwheel 164 is carried on the outer end of shaft 234 which is rotatably carried by bearings 235 that are carried by plate 236 supported by upstanding spacers on base plate 188. The end of the shaft 234 carries a worm 237 that engages a worm gear 238 that is carried on the lower end of a vertical shaft 239. The worm gear 238 is supported on the lower end of the shaft 239 by a friction clutch which is shown in Figs. 32 and 46. This clutch includes a sleeve 240 which is pinned to the lower end of shaft 239 and which carries the radially projecting springs 241. These springs press upwardly against a collar 242 which is secured to the gear 238. Normally the worm 237 will rotate gear 238 and the shaft 239 will be driven through the frictional engagement of collar 242 and springs 241. However, if rotation of shaft 239 is resisted, the gear 238 will merely rotate on sleeve 240 and the shaft will not be rotated.

The shaft 239 is disposed within the vertically disposed sleeve 243 (Figs. 30, 32 and 46) which is carried by the plate 236. The upper end of the shaft 239 carries the pointer 244 which cooperates with the calibrated segment 245 of the rudder angle indicator 165. This segment 245 is carried by a plate 246 which is supported directly beneath the top wall of the control unit housing by means of vertical plates 247 which are fastened to the horizontal plate 236. The segment 245 is disposed beneath the glass panel 187 which is provided on the top of the housing.

The mechanism for positioning the contacts 166 of the circuit for the motor 168 is shown best in Figs. 30, 31, 34, 35, and 35a. The shaft 239 (Figs. 30 and 31) has keyed on its upper end a pinion 248 which meshes with a rack 249. The rack 249 is slidably mounted on a plate 250 which is associated with the upper end of shaft 239 and is secured to plate 246. The rack is provided with a stop 251 which, in cooperation with the opposing spaced adjustable stop screws 252 that are carried by plate 250, limits, longitudinal movement of the rack 249. It will be apparent that rotation of shaft 239 will move the rack. If the helm 164 is turned after the stop 251 contacts with either of the stops 252, the worm gear 238 will rotate relative to the shaft 239, thus preventing injury to the gear mechanism and other parts.

Figure 35:
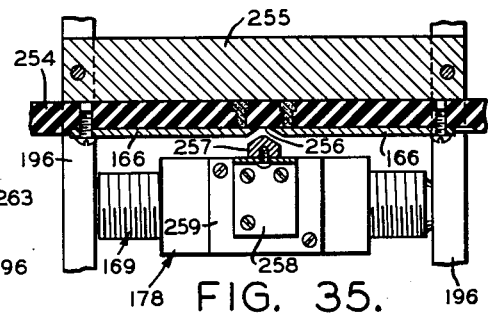
Fig. 35 is a horizontal sectional view taken along line 35—35 of Fig. 33.

The end of the rack is connected by a fitting 253 to the end of a bar 254 which is slidably mounted in a bearing block 255 (Figs. 30 and 33) which is secured to the top of frame 196 parallel to and closely adjacent to the wedge carrying block 178. The bar 254 is made of dielectric or non-conducting material. The exposed edge of this bar 254 carries the rudder position contacts 166. These contacts are in the form of longitudinally extending metal strips which are spaced apart so that there is a short gap 256 (Fig. 35) between their adjacent ends. For completing a circuit with the contacts 166, a contact member 257 is provided and is carried by the member 178, as shown in Figs. 30, 33, and 35. This contact 257 is normally disposed in gap 256. It is carried on the upstanding arm of an L-shaped bracket 258 which is secured to an insulating block 259 that is attached to the top surface of member 178. The contact 257 is disposed midway between the ends of member 178 and the spring arm of the bracket 258 forces the contact towards the bar 254. A contact roller 260 is carried on the upper end of bracket 258 but is insulated therefrom. This roller 260 is disposed between a bar 261 and a block 262. The block 262 is fastened to the top surface of block 255 and is made of insulating material. The bar 261 (Fig. 34) is secured to and spaced from the block 262 by means of spacers 263. The inner surface of the bar 261 carries a contact strip 264. The inner surface of the block 262 carries three longitudinally spaced contact members 265.

As will later appear, the contact strips 166 are connected in an electric circuit to the motor 168 (Fig. 27). The contact strip 264 and the contacts 265 are connected in a circuit to a time delay relay 266 which is disposed in the space beneath the base plate 188, as shown in Fig. 28. This time delay relay is connected in the circuit of the motor 168 and controls such motor. The relative positioning of the contacts 166, the contact 264, the contacts 265, and the roller contact 260 is illustrated in Fig. 35a.

The motor 168 (Figs. 27 and 29) is carried by the base plate 188 and is disposed closely adjacent to the screw 169. This motor is a reversible motor of a suitable type. The motor drives a speed reduction gear unit 267 which is carried by a small frame 268 attached to the frame 196. The gear unit 267 drives the pinion 269 which rotates the screw 169 as shown in Figs. 27 and 29. The screw 169 is rotatably carried by the frame 196. As previously stated, this screw carried the wedge carrying block 178. Rotation of the screw moves the member 178 axially thereof and, consequently, moves the roller 160 relative to the disk 159. Movement of member 178 also moves the contact 257 (Fig. 35) relative to the contacts 166.

Figure 36:
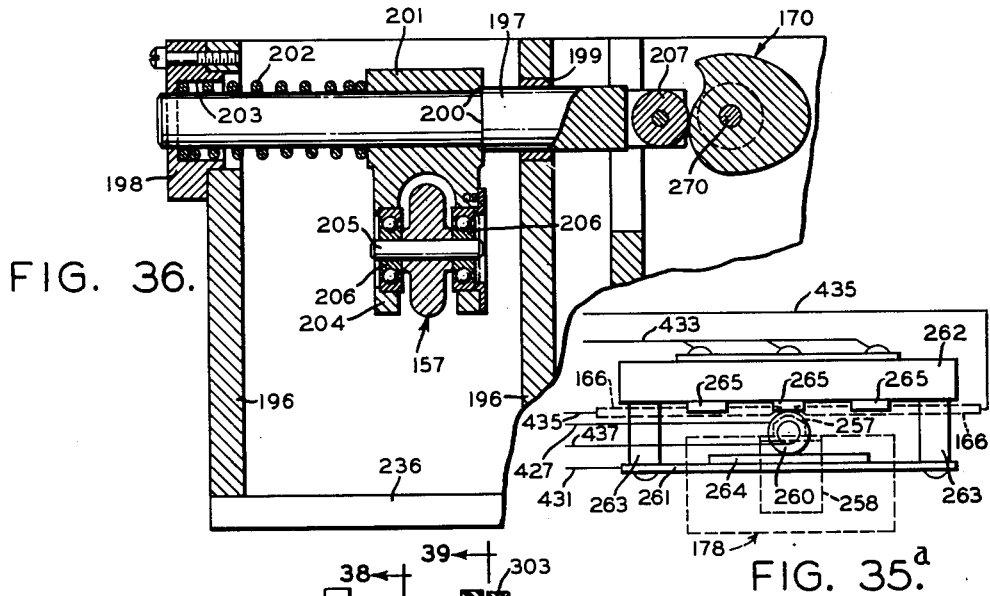
Fig. 36 is a vertical sectional view taken along line 36—36 of Fig. 27.

The cam 170 which moves the integrator roller 157 relative to the integrator disk 156 is shown in Figs. 27 and 36. The cam 170 is keyed on a shaft 270 which is rotatably supported by means of a bearing bracket 271 (Figs. 27 and 29) which is carried by the frame 196. The shaft 270 has a pinion 272 keyed on its outer end which meshes with a pinion 273 keyed on the end of a shaft 274. The shaft 274 is rotatably carried by the bearing brackets 275 (Fig. 27) which are attached to the plate 236.

The shaft 274 is driven by the motor 171 which is a reversible motor that is supported by plate 236 above the base plate 188 and closely adjacent the motor 155, as shown in Fig. 27. The shaft 274 is driven from the motor by means of gearing including a gear 276 (Figs. 27, 37 and 48) which is keyed on the shaft. The gear 276 meshes with a gear 277 which is carried by a stub shaft 278 (Figs. 46 and 48) that is supported by a plate 279 which is supported by the plate 236. The gear 277 meshes with a gear 280 which is keyed to a shaft 281 that is rotatably carried by the plate 279 and by a plate 282. The plate 282 is secured at the end of plate 236 in spaced relationship to the plate 279. The gear 280 meshes with a pinion 283 (Figs. 27, 28, 47) which is keyed on a stub shaft 284 that is rotatably carried by the plate 279. The shaft 284 carries the gear 285 which is part of a speed reduction gear unit 286 that is driven by the motor 171. Thus, it will be apparent that the motor 171 will serve to drive the cam 170.

The speed indicating dial 172 is carried by the shaft 281 to which it is keyed. This dial projects upwardly through a slot formed in the plate 246 that is supported by plates 282, 279, and 247. Thus, the dial will be disposed directly below the glass panel 187 (Fig. 24) in the top of the housing.

The outer end of the shaft 281 has a pinion 287 (Figs. 27 and 46) keyed thereon. This pinion meshes with a pinion 288 keyed on the upper end of the shaft of a selsyn 289. The selsyn 289 is vertically disposed (Figs. 28 and 46) and extends downwardly through the base plate 188. The selsyn is supported by the plate 188 and the plate 236.

It is not necessary to provide the selsyn 289 as part of our control unit. It can be provided, however, if desired, for serving as a generator for actuating an identical selsyn to control a duplicate of the speed indicating dial 172 at a point remote from the control unit.

Figure 37:
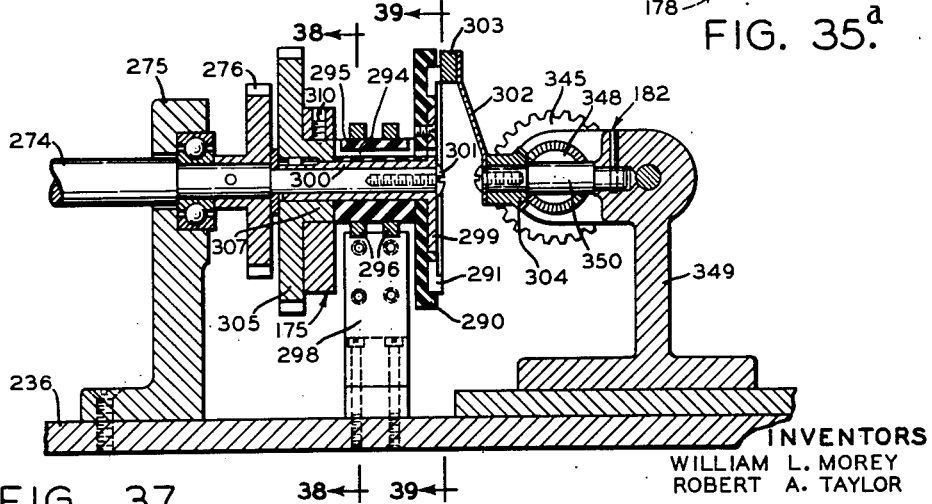
Fig. 37 is a vertical sectional view taken along line 37—37 of Fig. 27.

The split ring switch 173 is associated with the shaft 274 (Fig. 27) which is driven by motor 171. This switch is shown in detail in Figs. 27, 37, 38, and 39. The switch includes a disk 290 of insulating material which is mounted on the end of shaft 274 (Fig. 37). This disk 290 has a pair of contacts 291 fastened to the face thereof and being in the form of ring segments. The segmental contacts 291 are so arranged that a narrow gap 292 is formed between two of the adjacent ends and a wide gap 293 is formed between the two other adjacent ends. For completing a circuit to the contacts 291, connecting wires pass through small passages 294 (Fig. 37) that extend through the disk 290 and through an insulating collar 295 disposed on the shaft 274 next to the disk. The wires are connected to a pair of contact rings 296 which surround the collar 295. The rings 296 (Fig. 38) are engaged by a pair of upstanding spring contacts 297. These contacts 297 are carried by an insulating block 298 which is supported by the plate 236 adjacent the shaft 274. The disk 290 is attached to the peripheral flange 299 on the end of sleeve 300. This sleeve is rotatably mounted on the reduced end of the shaft 274 and is held thereon by a screw 301 threaded into the end of the shaft. The flange 299 has openings aligning with passages 294 in collar 295 through which the wires pass.

The pointer of the switch 173 is in the form of a spring finger 302 (Fig. 37) which urges a contact 303 against the segmental contacts 291. The finger 302 is secured to a bevel pinion 304. The pinion 304 is part of the differential gear unit 182 previously referred to. When the pinion 304 is rotated, the finger 302 will move the contact 303 over the segmental contacts 291. The contact 303 is not of sufficient width to bridge the gap 293 and is initially in such gap so that the circuit to motor 171 is broken. As will be explained in detail hereinafter, the contact 303 and the contact rings 296 are connected in a circuit which controls the motor 171.

The cam 175 which controls the position of the pivot point 176 of lever 179 is carried by a gear 305 (Fig. 37) which is keyed to the sleeve 300 that carries the disk 290. This gear 305 meshes with a gear 306 (Fig. 48) which is bolted to the gear 277 that is driven by motor 171. The gears 306 and 305 are in the ratio of 1:2 while the gear 277 and the gear 276 which is keyed to shaft 274 are in the ratio of 1:1. Thus, because of this difference of gear ratios, the cam 170, which is driven from motor 171 by gears 277 and 276, will be rotated through 360° while the cam 175, which is driven from the motor 171 by gears 306 and 305, will be rotated through 180°. Relative rotation between gear 305 and gear 276 on shaft 274 will be permitted because of the fact that gear 305 is carried by sleeve 300 which can rotate on shaft 274. The disk 290 will rotate with and at the same speed as the gear 305.

The cam 175 is shown best in Fig. 40. It comprises a main section of the shape shown which embraces and which is clamped around the hub 307 of the gear 305 by means including the segmental clamping member 308. The clamping member 308 is secured to the main section of the cam by means of screws 309. When these screws are loosened, the cam may be shifted on gear 305 around the shaft 274. To secure the cam in position, the screws 309 are tightened and a set screw 310, provided on member 308, is tightened until it firmly engages the hub 307.

The cam 175 engages a button 311 provided on the outer end of a rod 312. This rod is slidably carried by means of a casting 313. The casting 313 (Figs. 27 and 33) is carried at one side of the frame 186. The button 311 is maintained in contact with the cam 175 by means of a compression spring 314 which surrounds the rod 312 and has one end engaging the casting 313 and the other end engaging the collar 315 secured to rod 312. The opposite end of the rod 312 is attached to a block 316 which carries the slidable pivot member 176. The block 316 is slidably mounted in a guide formed on a shelf 317 on the end of the casting. The guide includes a small vertically disposed plate 318 (Fig. 33) attached to the outer edge of the casting adjacent the pivot 176.

The lever 179 has one end carried by the pivot 176, as previously indicated. This lever extends in the same general direction as the rod 312. The casting 313 (Figs. 27 and 40) carries a small plate 319 which extends over the lever 179 and prevents upward distortion thereof. A small spring 320 (Fig. 27) carried by casting 313, engages the edge of lever 179 and tends to swing it outwardly. Such movement of the lever is limited by an adjustable set screw 321 which is carried by an extension of the casting 313.

The plunger 177, which controls swinging movement of the lever 179 about the pivot 176, is slidably carried in a sleeve 322 (Figs. 27 and 33) formed on the casting 313 adjacent the wedge carrying block 178. The block 178 carries an L-shape bracket 323 which has the wedge surface 324 formed on its outer edge. One end of the plunger 177 engages the wedge surface 324 and the other end engages the inner edge of the lever 179.

The outer end of the lever 179 is associated with a plunger 325, as shown in Fig. 41, which engages its outer edge. This plunger 325 is slidably carried by a boss 326 formed on projecting portion of the bracket 313. The outer end of this plunger is connected by a small link 327 to a member 328 (Figs. 41 and 42) which is mounted for rocking movement about the axis of a shaft 329. The member 328 is provided with an upstanding arm 330. A tension spring 331 has one end connected to the upper end of arm 330 and the other end connected to an anchoring pin 332 carried by the bracket 313. The spring 331 normally tends to rock the member 328 about shaft 329 in such a manner that the plunger 325 will be forced inwardly thereby tending to swing the outer end of the lever 179 inwardly.

It will be apparent that since the outer end of the lever 179 is normally urged inwardly, the plunger 177 will be in firm engagement with the lever and the wedge surface 324. Thus, when member 178 is moved laterally by screw 169, the plunger will follow the wedge surface 324 and the lever 179 will be swung inwardly about pivot 176. The cam 175, when rotated, will move the rod 312 longitudinally and will thereby move the pivot 176 to a different position.

As shown best in Fig. 42, the shaft 329 is rotatably carried by a bearing bracket 236a which is attached to the plate 236. The rockable member 328 is nonrotatably secured to the outer end of the sleeve 332 which is carried by ball bearings 333 supported by bracket 236a. The sleeve 329a is mounted for rotation on the shaft 329. A second separate sleeve 334 is keyed on the extreme outer end of shaft 329 and carries a disk 335 on its outer end. This disk 335 is of insulating material and its face carries the laterally spaced tachometer contacts 180 which are in the form of opposing adjustable screws. Carried by sleeve 334 is an insulating collar 336 which carries a pair of spaced contact rings 337. Wires pass through the passageway 338 in the disk and collar to connect the contacts 180 with the ring contacts 337. The ring contacts 337 are engaged by a pair of spring contacts 339 (Figs. 27, 41 and 44) which are like the contacts 297 (Fig. 38). An insulating disk 340 may be provided on shaft 329 between collar 336 and member 328.

The inner end of the sleeve 329a carries a disk 341, as shown best in Figs. 42, 43, and 45. This disk 341 carries a pinion 342 and a pinion 343, which intermesh with each other and both of which are adapted to travel around a sun pinion 344 disposed concentric with disk 341 but rotatable with the shaft 329. It will be noted from Fig. 42 that pinion 343 is spaced from disk 341 and does not mesh with gear 344, although it does mesh with pinion 342. The sun gear 344 meshes with a gear 345 which is keyed to a stub shaft 347 which also has keyed thereon a bevel gear 348 (Fig. 45) which meshes with the bevel pinion 304 previously referred to, that is part of the differential gearing 182 and carries the contact finger 302 (Fig. 37). The shaft 347 is carried by a bracket 349 which is secured to plate 236 adjacent the bracket 236a. The pinion 304 is carried by stub shaft 350 which is rotatably supported by bracket 349 (Figs. 37 and 45).

The gear 345 as shown in Figs. 42, 43, and 45 has extending radially from the hub thereof a pin 351. This pin 351 is engaged by an L-shaped arm 352 which is carried by the outer end of the lever 179. When the outer end of the lever 179 swings inwardly about pivot 176, the arm 352 (Fig. 27), engaging the upper end of pin 351, will rotate the gear 345 about the shaft 347. This will rotate the pinion 304 and thereby shift the pointer 302 of the split ring switch 173. Rotation of gear 345 also rotates gear 344 and, consequently, shaft 329 which, in turn, rotates disk 335 and shifts contacts 180. However, when lever 179 swings outwardly, arm 352 will have no effect on pin 351.

A pinion 353 (Figs. 42 and 45) is disposed in axially spaced relationship to the sun gear 344 and concentric therewith. This pinion is keyed on the end of a shaft 354 which is rotatably carried by the bearing bracket 349. The pinion 353 meshes with the pinion 343 which will travel therearound upon rotation of the disk 341. The opposite end of the shaft 354 carries the bevel pinion 355 which meshes with a bevel pinion 356. This bevel pinion 356 is keyed on the end of a shaft 357 which is rotatably carried in an extension of the bracket 349. The outer end of shaft 357 carries a pinion 358 (Fig. 27) which meshes with a gear 359 that is keyed on the inner end of a shaft 360 which is rotatably carried by a bearing bracket 361 that is secured to the outer edge of the plate 236.

The speed control lever 174 is associated with the outer end of the shaft 360 which extends through the side wall of the housing for the control unit. This lever 174 is carried on the outer end of a sleeve 362 which is disposed on the outer end of the shaft 360. The inner end of the sleeve 362 is provided with a notch 363 which is adapted to be moved into engagement with a pin 364 carried by the shaft 360. A compression spring 365 is provided in the outer end of sleeve 362 and is in engagement with the head of a screw 366 which is threaded into the outer end of shaft 360. This spring 365 normally forces the sleeves 362 outwardly so that the notch 363 does not engage the pin 364. In this condition, the shaft 360 can rotate within the sleeve 362. However, the sleeve 362 may be forced inwardly by means of the handle 174 to cause notch 363 to engage the pin 364. As shown in Figs. 24, 25, and 26, the lever 174 swings within a stop bracket 367 which is carried by the side of the housing, and the lever is normally held in frictional engagement with this bracket by the spring 365.

It will be apparent that when the shaft 360 is rotated by means of advancing the handle 174, the position of the pointer 302 of the split ring switch 173 relative to contacts 291 will be changed, due to rotation of pinion 304 through the medium of gears 359, 358, 356, 355, pinion 353, pinion 343, pinion 342, gear 344, gear 345, and pinion 348. Rotation of the gear 345 will also shift the position of the outer end of the lever 179 due to the shifting of the pin 351. Rotation of the gear 344 also will produce rotation of the shaft 329 and thereby rotate the disk 335 and, consequently, shift the tachometer contacts 180 angularly.

When the lever 179 is swung in either direction about pivot 176, the member 328 is rocked. This will cause the sleeve 329a and disk 341 to be rocked and thereby cause the pinion 342 to travel about gear 344. This will rotate the pinion 342 about its own axis and thereby drive the pinion 343 and eventually the shaft 360, but without affecting the handle 174 which will remain in any position to which it is set due to the fact that the spring 365 will force the handle 174 outwardly into contact with the bracket 367. If the outer end of the lever 179 is moved inwardly, the arm 352 will swing the pin 351 inwardly, rotating the gear 345 and the pinions 348 and 304. This shifts the contact 303 relative to the contacts 291 on disk 290. Also, as previously stated, rotation of gear 345 also shifts contacts 180.

The tachometer 181 is associated with the tachometer contacts 180, being concentric with the disk 335. This tachometer 181 (Figs. 27 and 28) is carried by an upstanding bracket 368 which is attached to a spacer on the base plate 188. This tachometer may be of the magnetic drag type and includes a driven needle 369 which is adjacent to and cooperates with the tachometer contacts 180. The tachometer is shown best in Fig. 49a. It includes the driven shaft 370a which carries the disk-like magnet 370b. Spaced axially from the magnet 370b is an aluminum disk 370c. This disk carries the shaft 369a upon which is mounted the needle 369. A hairspring 369b is associated with shaft 369a to restrain rotation of the shaft.

This tachometer operates in the usual manner.

Rotation of the magnet 370b induces eddy currents in the disk 370c. The magnetic flux set up by these currents reacts with the magnetic flux of the rotating magnet to produce a torque which is proportional to the speed of the magnet. The disk 370c would turn with the magnet but is restrained from rotating by the spring 369b, the deflection of which is proportional to the torque acting on it. Therefore, the deflection of disk 370c and needle 369 is dependent upon the rotational speed of the magnet.

The shaft 370a of the tachometer 181 has a gear 370 (Fig. 27) keyed thereon. This gear 370 is driven by a gear 371 carried by the drive shaft of the D. C. drive motor 185. The motor 185 also has keyed to its drive shaft a gear 372 which drives a gear 373. This gear 373 is keyed to a shaft 374 which is disposed parallel to the drive shaft of the motor and is carried by the bearing brackets 375 which are secured to the base plate 188. Beyond the motor 185, this shaft 374 carries a pinion 376 which drives a gear 377 carried by the shaft of the selsyn 186. Thus, the motor 185 not only serves to operate the pointer 369 of the tachometer 181 but also provides a speed input into the selsyn 186 which will be connected to the analyzer unit 153.

The reversible motor 183 which operates the rheostat 184 is, as shown in Fig. 27, disposed adjacent the selsyn 163. This motor is carried by the base plate 188 and drives a speed reducing gear unit 378 which is carried by a frame 379 that is secured to the base plate 188. The gear unit 378 includes a friction clutch 380 which is the same as the clutch associated with the lower end of the shaft 239 (Fig. 32) which operates the rudder angle indicator 155. The shaft 381 with which the clutch 380 is associated carries the central contact arm 382 of the rheostat 184. This arm 382 cooperates with the resistance 383 of the rheostat 184. Thus, the motor 183 will serve to shift the arm 382 relative to the resistance 383 of the rheostat.

The circuit for the control unit of our apparatus is illustrated in Fig. 51. It comprises the direct current lines 384 and 385 which are connected to a suitable source of D. C. current. The line 384 is connected by a line 386 to motor 185 while the line 385 is connected by a line 387 to the motor 185. A line 388 leads from the motor 185 to the movable arm 382 of the rheostat 184. The resistance 383 of the rheostat is connected to the D. C. line 384 and also to the D. C. line 385. Thus, the motor 185 and the rheostat 184 are connected in parallel in a direct current circuit.

A line 389 and a line 390 are connected to a suitable source of alternating current. The lines 389 and 390 lead to the motor 171. A line 391 branches from the line 389 to the synchronous motor 155. A line 392 branches from the line 390 and is connected to the motor 155. Thus, the motors 171 and 155 are connected in parallel. The motor 171 is provided with a ground 393. The ground 393 is connected to the loop 394 which has the spaced condensers 395 interposed therein. Between the condensers 395, a line 396 is connected which leads to the pointer 302 of the split ring switch 173. A ground 397 is provided for the pointer. The contacts 291 of the split ring switch 173 are connected to the loop 394 by separate wires 398 in combination with the contact rings 296 and contact fingers 297 previously referred to.

A branch line 399 leads from the A. C. line 389 and a branch line 400 leads from the A. C. line 390 to the motor 183. This motor 183 is provided with a ground 401. A loop 402 is connected to the motor 183 and has the tachometer contacts 180 and the tachometer needle 369 incorporated therein. The loop 402 has incorporated therein the spaced condensers 403. A line 404 is connected to the loop between the condensers 403 and leads to the needle 369 of the tachometer. The needle is grounded by means of a line 405. The contacts 180 are connected to the loop 402 by wires 406 in combination with the ring contacts 337 and spring finger contacts 339 previously referred to.

Branch lines 407 and 408 are connected to the A. C. lines 389 and 390 and lead to the terminals 409 and 410, respectively. Lines 411 and 412 lead from the lines 407 and 408 and are connected to the terminals 413 and 414, respectively. Branch lines 415 and 416 connect the lines 407 and 408, respectively, to terminals 417 and 418 which are connected to lines 419 and 420. Branching from the lines 419 and 420 are the lines 421 and 422. The line 422 is connected to the terminal 423 of the delay action relay 266 while the line 421 is connected to the terminal 424 of the relay. The terminal 423 is connected by a wire 425 with a terminal 426 of the relay. The terminal 423 is connected by a wire 427 to the movable contact 267 carried by the wedge member 178 which is carried by screw 169. The terminal 424 is also connected by a line 428 to the motor 168. A line 429 leads from the motor 168 to the terminal 430 of the relay 266. The contact strip 264 is connected by a wire 431 to the terminal 432 of the relay 266. The contacts 265 are connected by a wire 433 to a terminal 434 of the relay 266. The contacts 166 are connected by a loop 435 to the motor 168. This loop has the condensers 436 connected therein. The contact ring 260 is connected by a lead 437 to the loop 435. Relative positions of the contacts 166, 264, 265, and 266 are illustrated better in Fig. 35a rather than in Fig. 51.

The true bearing repeater selsyn 231 is connected by means of the five lines 438, 439, 440, 441, and 442 to the terminals 445, 446, 447, 410 and 409, respectively. The course output selsyn 163 is connected by lines 448 and 449 to the lines 441 and 442, respectively, and by the lines 450, 451, and 452 to the terminals 453, 454, and 455, respectively. The speed transmission selsyn 186 is connected by the five lines 456, 457, 458, 459, and 460 to the terminals 414, 413, 461, 462, and 463, respectively. The speed repeater selsyn 269 is connected by the five lines 420, 419, 466, 467, and 468 to the terminals 418, 417, 469, 470, and 471, respectively.

The terminals 469, 470, 471, 463, 461, 462, 455, 454, 453, 447, 445, and 446 are all connected to the analyzer unit 153 to provide the speed and course input.

The operation of our control unit will now be described more in detail. The operation will be described under the two basic conditions previously mentioned. That is, first, change of the position of handle 174 only for control of the ship's speed, and second, change of the position of helm 164 only to change the rudder angle. However, it is to be understood that the control unit may operate under various combinations of these conditions.

Under the first mentioned condition, with the helm 164 in position to simulate rudder amidships and the ship dead in the water, the operator advances the speed control handle 174 until the selected speed is indicated by the dial 172, the dial being actuated in a manner to be described later.

Advancing the handle 174 causes the differential gear unit 182 (Fig. 27) to drive the pinion 353. The pinion 353 (Fig. 45) drives the pinion 343 which drives pinion 342, gear 344, (Figs. 42, 43, and 45), and thereby rotates shaft 329. Rotation of the shaft 329 produces rotation of disk 335 which changes the angular position of the tachometer contacts 180 relative to the needle 369 (Figs. 27 and 28). This causes the pointer 369 to move into association with one of the contacts 180 and thereby energizes the motor 183 to rotate the drive shaft thereof in the proper direction. When gear 344 is rotated, gear 345 is also rotated and shifts contact 303 of split ring switch 173 in the manner previously described.

The motor 183 (Fig. 27) drives the gear unit 378 which, in turn, rotates the shaft 381 and swings the rheostat contact arm 382, of rheostat 184, relative to the resistance element 383. Thus, electric energy is supplied to the armature of the D. C. motor 185 and this motor drives distance selsyn 186 through the pinion 372, gear 373, shaft 374, gear 376, and gear 377. The distance selsyn 186 rotates at a speed proportional to the setting of the contact arm 382 of the rheostat, thus, providing speed input to an analyzer unit 153 (Fig. 23) to which the control unit may be connected. It is obvious that the position of the contact arm 382 of the rheostat is determined by the setting of the handle 174 of the speed control. This, in turn, determines the initial relationship of the tachometer contacts 180 to the tachometer needle 369. The motor 185, when energized, also drives the tachometer 181 through the medium of gear 371 (Fig. 28) and gear 370. The pointer of the tachometer will be moved by the motor 185 until magnetic balance is established between the pointer 369 and the contacts 180 which will interrupt the supply of electric current to the motor 183, thus stopping it and allowing the center contact arm 382 of the rheostat 184 to remain stationary. Thereafter, there will be a constant supply of energy to the motor 185 and, consequently, the selsyn 186 will give a constant speed input to the analyzer unit 153 which is proportional to the indication on the speed dial 172.

The rotation of the speed dial 172 until it indicates the speed selected by movement of the lever 174 is accomplished by energizing the motor 171 which results upon movement of the handle 174. When the handle 174 is moved, it operates the gear unit 182 to rotate the pinion 304 (Fig. 37) which carries the contact 303 of the split ring switch 173. Initially, before movement of the contact 303, it occupies a position in the gap 293 (Fig. 39) between the segmental contacts 291 and at that time the circuit to motor 171 is broken. However, when the pinion 304 is rotated, the contact 303 moves in one direction into contact with one of the segmental contacts 291 and completes the circuit to the motor 171. The motor 171 drives the gear unit 286 (Fig. 27) which in turn drives gear 285 (Fig. 47). Rotation of gear 285 produces rotation of pinion 283 which drives the gear 280 that is carried by the shaft 281. The shaft 281 also carries the speed indicating dial 172 and, therefore, the speed indicating dial will be properly rotated.

Rotation of the gear 280 also drives the gear 277 (Fig. 48), gear 276, and, consequently, shaft 274. The shaft 274 (Fig. 27) drives the shaft 270, through the medium of double gears 273 and 272, and this rotates the cam 170. Rotation of the cam 170 moves the rod 197 axially and, thereby, moves roller 157 off the center of the integrator disk 156. The disk 156 is constantly driven through the medium of the constant speed motor 155, which is energized at all times, through the medium of the gears 192, 193, and the unit 201. Movement of the roller 157 off the center of disk 156 causes the cylinder 158 to be driven and to thereby drive the integrator disk 159 through the medium of gears 209, 210, shaft 211, and the unit 212. However, since the helm 164 is in such a position that the rudder is amidships, the roller 160 will remain at the center of disk 159 and will not be rotated. The motor 171 will drive, thereby rotating the cam 170 and the disk 290 of the split ring switch 173, until the circuit to the motor is broken. This is accomplished in time because of the fact that the disk 290 (Fig. 37) is carried by the shaft 274 which is rotated by motor 171 and, therefore, the disk 290 and the contacts 291 (Fig. 39) carried thereby are rotated relative to the contact 303 which will eventually again be positioned in the gap 293, at which time the circuit to the motor 171 is broken. The disk 290 is rotated by motor 171 in a direction opposite to that in which the pointer 302 is initially swung by operation of handle 174.

The rate of acceleration of the speed of the ship from zero up to the speed selected is determined by the gear ratios of the gear unit 286, driven by motor 171, and the gear unit 378, driven by the motor 183. The unit 286 will actuate the speed indicating dial 172, as previously indicated, to bring it up to the proper speed indicating position while the gear unit 378 will control the electric energy supplied to the motor 185 to cause the selsyn 186 to provide the proper speed input to the analyzer 153.

The cam 175 is also rotated by the motor 171. As previously indicated, the motor 171 drives the gear 277 (Fig. 48) and the gear 306 will rotate therewith. This gear 306 meshes with the gear 305 that carries the cam 175. The gear 305 is carried by the sleeve 300 (Fig. 37) and is keyed thereon, the sleeve being free to rotate relative to the shaft 274. Since the gear 305 is, therefore, rotatable relative to the shaft 274, the gear 276 and the gear 305 may be driven by motor 171 at different speeds. Because the gears 306 and 305 are in the ratio of 1:2 while the gears 277 and 276 are in the ratio of 1:1, the cam 170 will be driven through 360° while the cam 175 and the disk 290 will be rotated through 180°. Rotation of the cam 175 shifts the rod 312 longitudinally and moves the pivot 176 of the lever 179. However, since wedge block 178 has not been moved and, consequently, plunger 177 is at the center of the wedge surface 324, the lever 179 will not be affected and will not swing about pivot 176. Thus, for each position of dial 172 there is a different position for pivot 176 which provides for a particular speed decay for each indicated speed, as will later appear.

Under the second mentioned condition with the rudder amidships and the handle 174 positioned to give the previously selected speed, the helm 164 is turned until a selected rudder angle is reached which will be shown by indicator 165. The indicator 165 is actuated by the shaft 234 (Fig. 30) which is turned by handle 164 and which carries the worm 237. The worm 237 rotates gear 238 which is carried by a vertical shaft 239 and, consequently, moves the pointer 244 which is carried by the shaft.

Advancing the helm 164 moves in one direction the bar 254 which carries the rudder position contacts 166. One of the contacts 166 is thereby moved into contact with contact 257 (Fig. 35) carried by the wedge member 178. This will complete the circuit to the delayed action relay 266. After a short delay, the motor 168 will be energized and will rotate the screw 169. At this time the contact 257 is still in contact with one of the contact strips 166. The circuit to the motor 168 will be maintained until the contact 257 is moved, in the same direction as the initial movement of rod 254, by rotation of the screw 169 and resulting movement of member 178, into the gap 256, at which time the circuit to the motor will be broken.

Before the initial movement of rod 254, the contact roller 260 is in contact with the center contact 265, thereby connecting the time delay relay 266 in circuit with the motor 168. Therefore, whenever one of the contacts 166 is moved into contact with the contact 257 by movement of rod 254 the relay is actuated. However, as soon as member 258 is moved by movement of screw 169, the roller 260 moves off the center contact 265 and disconnects the relay from the motor circuit but the motor is still energized. When the member 257 has been moved into the gap 256 again, the roller 260 will be in contact with one of the end contacts 265, and the time delay relay is again connected in the circuit with the motor. Therefore, the relay will again be actuated upon movement of rod 254 to cause one of the contacts 166 to move into contact with member 257.

When the motor 168 is energized, it drives the speed reduction gear unit 267 (Fig. 27) which rotates the gear 269. The screw 169 rotates with this gear. This, in turn, moves the member 178 axially of the screw and, consequently, moves the roller 160 off the center of the integrator disk 159. Consequently, the roller 160 is driven and, in turn, drives the cylinder 161. The cylinder 161 drives the shaft 221 which causes the worm 223 and gear 224 to rotate the vertical sleeve 225 (Fig. 49) and the dial 226 carried thereby. The shaft 230 of the repeater selsyn 231 is also rotated. The shaft 221 also drives the pinion 232 and the gear 233 which operates the course selsyn 163. Thus, the selsyn 163 will supply the course input to the analyzer unit 153. The dial 162 will indicate true bearing at any instant and, consequently, will indicate the rate of change of the ship's heading.

As previously indicated, rotation of screw 169 by motor 168 also moves the member 178 which carries the contact 257 that cooperates with the rudder position contacts 166. Movement of the helm 164 moves the member 257 into contact with one of the contacts 166 depending upon the direction of rotation of the helm 164 or whether there is "right rudder" or "left rudder." Furthermore, the position of the contact 257 along the length of the contact 166 will depend upon the degree of angle to which the rudder is moved by handle 164. When the screw 169 is rotated and the member 178 is moved, the contact 257 is moved back along the contact 166 until the gap 256 is reached. At this time the circuit to the motor 168 will be broken. The time taken for the motor 168 to move roller 160 to the extent determined by rudder position contacts 166, determines the acceleration in the rate of change in the ship's heading up to the point where it reaches its turning circle, at which time the motor 168 stops and the rate of change of the ship's heading becomes constant.

Advancing the helm 164 causes the screw 169 to move the member 178 laterally, as previously indicated. The plunger 177 will follow the surface 324 of the wedge and will allow the lever 179 to swing inwardly about the pivot 176. Swinging of the lever 179 inwardly about pivot 176 will permit rocking of member 328 (Fig. 41) by spring 331. When member 328 is rocked, the sleeve 329a and consequently, the disk 341 are rocked, causing pinion 342 to travel around gear 344, as previously described. Moving lever 179 inwardly will cause arm 352 to swing pin 351 inwardly and rotate gear 345, as previously explained. This will rotate the disk 335 and change the angular position of the tachometer contacts 180 relative to the tachometer needle 369. Consequently, a point of magnetic equilibrium of tachometer 181 will be relocated with a resulting reduction of the speed indication on dial 172. Rotation of gear 345 also rotates pinion 304 and shifts contact 303 of the split ring switch 173, with resultant speed decay which will be indicated on speed dial 172. Speed decay in the turning circle of the ship is conditioned by the position of the pivot point 176 of lever 179 which will be changed laterally by rocking of the cam 175. Shifting pivot point 176 will vary the effective length of lever 179 and, therefore, will vary the degree of swinging of pin 351 and, consequently, the degre of rotation of gear 345. Thus, for each selected speed, change of the helm 164 involves a particular resultant speed decay.

In Fig. 23 we have illustrated a suggested layout of our apparatus for use in a shore based CIC school. Three separate compartments are provided. The one compartment A is for the instructor and contains one of our control units 154 for the target and one of our double table units 1, an analyzer unit 153 for the target and a battle telephone 472. The middle compartment B, simulating own ship bridge, has one of our control units 154 for own ship disposed therein and a battle telephone 473. A student officer is located in this bridge compartment. The other compartment C is for a student officer and simulates own ship CIC room. It contains an analyzer unit 153 for own ship and a table 1b which is identical with the upper half of the table 1, or in other words, indicates own ship's position. A battle telephone 474 is disposed in this compartment. The telephones 472, 473, and 474 are interconnected. The control unit 154, the analyzer 153, and the table 1 in compartment A are interconnected, the analyzer being connected to the lower half or enemy ship part of the table. The upper half or own ship part of the table 1 is connected to the analyzer 153 in compartment C and the analyzer, in turn, is connected to the single table 1b. The control unit 154 in compartment B is connected with the analyzer 153 in compartment C.

The arrangement suggested above may be used in shore based CIC schools for the training of officers and CIC teams in battle tactics and ship maneuvers for torpedo attacks, surface gunnery, laying smoke screens, convoy shielding, and similar ship problems. The equipment, insofar as CIC training is concerned, is substantially the equivalent of permitting practice with two ships at sea.

The student officer in the compartment C will be observing the table 1b which will indicate own ship's position. By telephone he will communicate to the student officer in own ship's bridge compartment B, the necessary information for conning own ship. The student officer in B, receiving instructions from the student officer in C, will operate the control unit 154 in B to supply the selected speed and course input and the resultant's own ship's movements will be indicated on the table 1b to the student in compartment C. The student officer in compartment C will receive information from a plotter stationed at the table 1 in compartment A as to the bearing and range of the target. The relative positions of own ship and target will be indicated on double table 1. Thus, the student officer in compartment C has a reproduction of conditions paralleling those of a CIC room afloat. The control unit 154 of the bridge compartment, in addition to operating the table 1b for the student officer in compartment C, also operates the upper half, or own ship part, of the double table 1 which is located in the instructor's compartment A. The control unit 154 in compartment A will be operated by the instructor and controls the lower half, or target part, of the double table 1. If it is desired to pit two CIC teams against each other under realistic conditions, the same can be accomplished by providing an arrangement for the instructor comparable to that shown for the student officer, that is, with an additional table 1b and the bridge compartment arrangement, relative bearings and ranges being transmitted from the plotter at the double table in the instructor's compartment by phone to both teams.

Prior to the development of our equipment, CIC training has been conducted:

(1) Without the ability to project a synthetic ship's track having the true characteristics of the ship's maneuverability onto a dead reckoning tracer; and (2) Without the ability to change the synthetic target's track at will to counter the movements of the student's own ship, it being necessary in the past to start the training problem with the target's track predetermined but unknown to the student.

The result of the use of our equipment is to greatly enhance the realism, the exactness, and the value of the CIC training program, CIC being one of the outstanding developments in fleet tactics of World War II.

There are other possible uses of our equipment, among which may be mentioned the following:

(1) By minor alterations in the instructor's control unit to simulate maneuverability characteristics of a submarine, our equipment is suitable for anti-submarine warfare training work as the same concerns CIC;

(2) By adding certain mechanism to the control unit, such as remote speed indicators and true bearing indicators, the equipment could be used for training helmsmen and officers in ship maneuvers.

(3) With no modifications, the equipment could be installed together with an extra dead reckoning analyzer, aboard ship (utilizing ship's standard dead reckoning tracer and dead reckoning analyzer) and thus permit CIC training and practice afloat.

(4) Using the double table principle, the target "spot" could be positioned manually on a chart for target identification during shore bombardment; or might be employed, in conjunction with manually operated course input and dummy log equipment, for setting a moving target on the last known course and speed of the target.

The invention described herein may be manufactured and used by or for the Government of the United States of America for governmental purposes without the payment of any royalties thereon or therefor.

Various other objects and advantages of our invention will be apparent from the preceding description, the drawings and the following claims.

What we claim is:

1. A control unit comprising a speed input selsyn, an electric motor for operating said selsyn, a velocity operated switch actuated by said motor, a reversible motor controlled by said velocity operated switch, a rheostat controlled by said reversible motor, said rheostat having a movable contact which is moved by said reversible motor, said rheostat being connected in circuit with said first-named motor to vary the current supplied thereto, said velocity operated switch including a needle mounted for swinging movement and actuated by said first-named motor, a pair of contacts between which said needle swings, said needle and contacts being connected in circuit with said reversible motor, said pair of contacts being supported for angular movement relative to said needle, and a speed control handle for varying the position of said contacts relative to said needle.

2. A control unit comprising a speed input selsyn, an electric motor for operating said selsyn, a control switch actuated by said motor, a second motor controlled by said switch, a current-varying unit actuated by said second motor, said unit being connected in circuit with said first-named motor to provide a variable control therefor, manually operable means to control said switch, a speed-indicating unit, a third electric motor for actuating said indicating unit, and a control switch for controlling said third motor, said last-mentioned switch being controlled by said manually operable means.

3. A control unit comprising a speed input selsyn, an electric motor for operating said selsyn, a velocity operated switch actuated by said motor, a second motor controlled by said velocity operated switch, a rheostat controlled by said second motor, said rheostat being connected in circuit with said first-named motor to provide a variable control therefor, manually operable means to control said velocity operated switch, a speed-indicating unit including a rotatable dial, a third electric motor which is reversible for driving said dial, a control switch for controlling said third motor, said switch consisting of a contact unit movable by said third motor, and a contact movable by said manually operable control means.

4. A control unit comprising a speed input selsyn, an electric motor for operating said selsyn, a velocity operated switch actuated by said motor, a reversible motor controlled by said velocity operated switch, a rheostat controlled by said reversible motor, said rheostat having a movable contact which is moved by said reversible motor, said rheostat being connected in circuit with said first-named motor to vary the current supplied thereto, said velocity operated switch including a needle actuated by said first-named motor, a pair of contacts associated with said needle, said needle and contacts being connected in circuit with said reversible motor, manually operable means to control said velocity operated switch, a speed-indicating unit including a rotatable dial, a third electric motor which is reversible geared to said dial, a control switch for controlling said third motor, said switch consisting of a contact needle mounted for sliding contact with a split ring contact, said split ring contact being carried by a shaft driven by said third motor, and said needle being carried by a shaft which is rocked by said manually operable control means.

5. A unit according to claim 4 wherein said manually operable control means comprises a movable handle which is geared to said shaft which supports the needle of the split ring switch, said pair of contacts of the tachometer being carried by a rotatable support, said handle being geared to said support.

6. A control unit comprising a course input selsyn, a constant drive electric motor for operating said selsyn, a speed output selsyn, a second electric motor for operating said speed output selsyn, a current-varying unit for controlling the second motor, a third motor for controlling said current-varying unit, a velocity operated switch actuated by said second motor for controlling the third motor, manually operable means for adjusting said switch, a fourth electric motor, a speed indicator operated by said fourth motor, a control switch for actuating said fourth motor including a rotatable contact unit driven thereby and a cooperating contact member movable by said manually operable means, a variable drive from the constant motor to the course selsyn, said variable drive including two variable drive units, a cam driven by the fourth motor for operating one of said drive units, and a fifth motor for operating the other of said units.

7. Training apparatus comprising a plotting unit and a plurality of control units, said plotting unit comprising a plotting surface, a plurality of frames disposed in spaced relationship to said plotting surface, a plurality of carriages, each of said frames having one of said carriages mounted thereon, each of said carriages being adapted to project an indication of an object upon said plotting surface, means for moving each of said carriages, each of said control units controlling one of said last-mentioned means, each of said control units comprising a speed input element, a course input element, output means coupled to said carriage moving means to control the operation thereof and integrating means operatively associated with said two input means and said output means, said integrating means being adapted to combine data supplied to said two input means in accordance with the operating characteristics of a selected vehicle and to supply said combined data to said output means to control the operation thereof.

8. A training apparatus comprising a plotting unit and a first and a second control unit, said plotting unit comprising a plotting surface, first and second frames disposed in spaced relationship to said plotting surface, a first and a second carriage mounted on said first and second frames, respectively, each of said carriages being adapted to project an indication upon said plotting surface in predetermined relationship to the indication projected on said surface by the other of said carriages, means for moving each of said carriages, each of said control means controlling one of said moving means, said control units each including a speed input element, a course input element, output means coupled to said carriage moving means to control the operation thereof, and integrating means operatively connecting said speed input element and said course input element to said output means, said integrating means being adapted to combine data supplied to said two input elements in accordance with the operating characteristics of a selected naval vessel and to supply said combined data to said output means to control the operation thereof.

9. A control unit comprising a position transmitter, means providing a shaft rotation of a predetermined angular velocity, a control member, a variable speed drive unit responsive to said control member and connecting said means providing a shaft rotation to said position transmitter, and means operatively associated with said control member and said drive unit for introducing a delay between the time of actuation of said control member and the time of response of said drive unit.

10. A control unit comprising a position transmitter, means providing a shaft rotation of a predetermined angular velocity, a variable speed drive unit connecting said means to said position transmitter, a reversible motor adapted to control said drive unit, a control member, a control switch operatively associated with said control member and adapted to control the operation of said motor and means for introducing a delay between the time of actuation of said control switch and the time of energization of said motor.

11. A control unit comprising a course selsyn, a constant drive electric motor for operating said selsyn, a speed output selsyn, a second electric motor for operating said selsyn, a current-varying unit for controlling the second motor, a third motor for controlling said current-varying unit, a velocity operated switch actuated by said second motor for controlling the third motor, manually operable means for adjusting said switch, a fourth electric motor, a speed indicator operated by said fourth motor, a control switch for actuating said fourth motor including a rotatable contact unit driven thereby and a cooperating contact member movable by said manually operable means, a variable drive from the constant motor to the course selsyn, said variable drive including two variable drive units, a cam driven by the fourth motor for operating one of said drive units, a fifth motor for operating the other of said units, a speed decay control unit cooperating with said velocity operated switch and said control switch, and means for actuating said speed decay control upon actuation of the second of said variable drive units.

12. A control unit comprising a course selsyn, a constant drive electric motor for operating said selsyn, a speed output selsyn, a second electric motor for operating said selsyn, a current-varying unit for controlling the second motor, a third motor for controlling said current-varying unit, a velocity operated switch actuated by said second motor for controlling the third motor, manually operable means for adjusting said switch, a fourth electric motor, a speed indicator operated by said fourth motor, a control switch for actuating said fourth motor including a rotatable contact unit driven thereby and a cooperating contact member movable by said manually operable means, a variable drive from the constant motor to the course selsyn, said variable drive including two variable drive units, a cam driven by the fourth motor for operating one of said drive units, a fifth motor for operating the other of said units, a speed decay control unit for altering the setting of said velocity operated switch and said control switch, and a cam driven by the fourth motor for controlling the operation of said speed decay control unit.

13. A control unit comprising a course selsyn, a constant drive electric motor for operating said selsyn, a speed output selsyn, a second electric motor for operating said selsyn, a current-varying unit for controlling the second motor, a third motor for controlling said current-carrying unit, a velocity operated switch actuated by said second motor for controlling the third motor, manually operable means for adjusting said switch, a fourth electric motor, a speed indicator operated by said fourth motor, a control switch for actuating said fourth motor including a rotatable contact unit driven thereby and a coperating contact member movable by said manually operable means, a cam driven by said fourth motor, a variable drive from the constant drive electric motor to the course selsyn, said drive including a first drive unit controlled by said cam and a second drive unit including a fifth motor, a rotatable screw driven by said fifth motor, a speed decay control unit associated with said velocity operated switch and said control switch and means for actuating said speed decay control unit, said last-mentioned means including a wedge movable by said screw, a pivoted lever movable by said wedge and a second cam driven by said fourth motor for shifting the pivot point of said lever to vary the effective length thereof.

14. A control unit comprising a course selsyn, a constant drive electric motor for operating said selsyn, a speed output selsyn, a second electric motor for operating said selsyn, a current-varying unit for controlling the second motor, a third motor for controlling said current-varying unit, a velocity operated switch actuated by said second motor for controlling the third motor, manually operable means for adjusting said switch, a fourth electric motor, a speed indicator operated by said fourth motor, a control switch for actuating said fourth motor including a rotatable contact unit driven thereby and a cooperating contact member movable by said manually operable means, a cam driven by said fourth motor, a variable drive from the constant drive electric motor to the course selsyn, said drive including a first drive unit controlled by said cam and a second drive unit including a fifth motor, a rotatable screw driven by said fifth motor, a speed decay control unit operatively associated with said velocity operated switch and said control switch, means for actuating said speed decay control unit, said last-mentioned means including a wedge movable by said screw, a pivoted lever movable by said wedge, a second cam driven by said fourth motor for shifting the pivot point of said lever to vary the effective length thereof, a switch for controlling said fifth motor, said switch comprising a pair of elongated movable contacts, a helm member for moving said contacts, and a cooperating contact associated with said movable contacts and movable by said screw, all of said contacts being in the circuit with said fifth motor.

15. A control unit comprising a course selsyn, a constant drive electric motor for operating said selsyn, a speed output selsyn, a second electric motor for operating said selsyn, a current-varying unit for controlling the second motor, a third motor for controlling said current-varying unit, a velocity operated switch actuated by said second motor for controlling the third motor, manually operable means for adjusting said switch, a fourth electric motor, a speed indicator operated by said fourth motor, a control switch for actuating said fourth motor including a rotatable contact unit driven thereby and a cooperating contact member movable by said manually operable means, a cam driven by said fourth motor, a variable drive from the constant drive electric motor to the course selsyn, said drive including a first drive unit controlled by said cam and a second drive unit including a fifth motor, a rotatable screw driven by said fifth motor, a speed decay control unit operatively associated with said velocity operated switch and said control switch, means for actuating said speed decay control unit, said last-mentioned means including a wedge movable by said screw, a pivoted lever movable by said wedge, a second cam driven by said fourth motor for shifting the pivot point of said lever to vary the effective length thereof, a switch for controlling said fifth motor, said switch comprising a pair of elongated movable contacts, a helm member for moving said contacts, a cooperating contact associated with said movable contacts and movable by said screw, all of said contacts being in the circuit with said fifth motor, and means for energizing said fifth motor a predetermined time after said switch for controlling said fifth motor is actuated.

16. Means for altering the speed of rotation of a motor as a function of two variables comprising an adjustable, velocity operated switch for controlling the speed of said motor, adjustable pivot means, means for moving said pivot means in accordance with one of said variables, a link pivotally connected at one end to said pivot means and connected at an opposite end to said velocity operated switch, and means disposed intermediate the ends of said link for rotating said link about said pivotal connection in accordance with said second variable.

17. Means for altering the speed of rotation of a motor as a function of two variables comprising a switch including a first and a second adjustably mounted contact, a third contact and means adapted to position said contact in accordance with the speed of rotation of said motor, means for supplying energy to said motor, said energy supplying means being adapted to increase the energy supplied to said motor upon engagement of said first and third contacts and to decrease the energy supplied to said motor upon engagement of said second and third contacts, and means for altering the position of said first and second contacts, said last-mentioned means including a lever, a link providing mechanical coupling between a first end of said lever and said first and second contacts, a pivotal support connected to a second end of said lever, an operating member associated with said lever at a point intermediate the ends thereof, said operating member being adapted upon movement thereof to rotate said lever about said pivotal support, means for positioning said operating member in accordance with one of said variables and means for altering the spacing between said operating member and said pivotal support in accordance with the other of said variables.

18. Apparatus as in claim 17 wherein said energy supplying means is adapted to increase the supply of energy to said motor at a predetermined rate upon engagement of said first and third contacts and to decrease the supply of energy to said motor at a predetermined rate upon engagement of said first and third contacts.

19. Apparatus as in claim 15, said appparatus further comprising a frame, a carriage mounted on said frame, means for mounting said carriage for movement in two directions at right angles, and means responsive to the combined output of said course selsyn and said speed selsyn for moving said carriage in said two directions.

20. A control unit for controlling the speed of rotation of a motor comprising a velocity operated switch actuated by said motor, said velocity operated switch comprising a needle mounted for swinging movement about an axis coincident with the axis of the shaft of said motor, a magnet and a conductive disk disposed in spaced relationship to each other, one of said two last-mentioned spaced means being mounted for rotation with said motor shaft, the other of said two last-mentioned spaced means being mounted for swinging movement with said needle, means yieldably restraining swinging movement of said needle in the direction of rotation of said shaft, and a pair of contacts between which said needle swings, means responsive to contact between said needle and one of said contacts for increasing the speed of rotation of said motor, and means responsive to contact between said needle and the other of said contacts for decreasing the speed of rotation of said motor.

21. A control unit for controlling the speed of rotation of a motor comprising, a velocity operated switch actuated by said motor, said velocity operated switch comprising a needle mounted for swinging movement about an axis coincident with the axis of the shaft of said motor, a magnet and a conductive disk disposed in spaced relationship to each other, one of said two last-mentioned spaced members being mounted for rotation with said motor shaft, the other of said two last-mentioned spaced members being mounted for swinging movement with said needle, means yieldably restraining swinging movement of said needle in the direction of rotation of said shaft, a pair of contacts between which said needle swings, said pair of contacts being supported for angular movement about an axis substantially coincident with the axis of movement of said needle, and means for varying the angular position of said contacts about said axis, means responsive to contact between said needle and one of said contacts for increasing the speed of rotation of said motor, and means responsive to contact between said needle and the other of said contacts for decreasing the speed of rotation of said motor.

22. A control unit comprising an electric motor, a control switch actuated by said motor, a second motor controlled by said switch, a speed varying unit actuated by said second motor, said speed varying unit being coupled to said first-named motor to provide a variable speed control therefor, manually operable means to control said switch, a speed-indicating unit, a third electric motor for actuating said indicating unit, and a control switch for controlling said third motor, said control switch being controlled by said manually operable means.

23. A control unit comprising an electric motor, a velocity operated switch actuated by said motor, a second motor controlled by said velocity operated switch, a speed controlling means controlled by said second motor, said speed controlling means being coupled to said first motor to provide a variable speed control therefor, manually operable means to control said velocity operated switch, a speed indicating unit, a third electric motor which is reversible for driving said speed indicating unit, a control switch for controlling said third motor, said switch including a contact unit movable by said third motor, and a contact movable by said manually operable control means.

24. A control unit comprising an electric motor, a velocity operated switch actuated by said motor, a second motor controlled by said velocity operated switch, a speed controlling means controlled by said second motor, said speed controlling means being coupled to said first motor to provide a variable speed control therefor, manually operable means to control said velocity operated switch, a speed indicating unit having a movable member, a third electric motor which is reversible for driving said movable member, a control switch for controlling said third motor, said switch including a contact member mounted for sliding contact with a split ring contact, said split ring contact being rotatably mounted and coupled to said third motor, said contact member being rotatably mounted and coupled to said manually operable means.

25. A control unit for providing output data in the form of the rotative positions of a first and a second shaft comprising a constant drive motor, a second electric motor for operating said first shaft, a speed control unit coupled to said second motor to control the speed thereof, a third motor for actuating said speed control unit, a velocity operated switch actuated by said second motor for controlling the third motor, manually operable means for adjusting said switch, a fourth electric motor, a control switch for actuating said fourth motor including a rotatable contact unit driven thereby and a cooperating contact member movable by said manually operable means, a variable drive coupling said constant drive motor to said second shaft, said variable drive including two variable drive units, a cam driven by the fourth motor for operating one of said drive units, and a fifth motor for operating the other of said drive units.

26. A control unit as in claim 25, said control unit further comprising second manually operable means for controlling said fifth electric motor.

27. A control unit providing output data in the form of the rotative positions of a first and a second shaft comprising a constant drive electric motor, a second electric motor for driving said first shaft, a speed control unit coupled to said second motor to control the speed thereof, a third motor for actuating said speed control unit, a velocity operated switch actuated by said second motor for controlling said third motor, manually operable means for adjusting said velocity operated switch, a fourth electric motor, a control switch for actuating said fourth motor including a rotatable contact unit driven thereby and a cooperating contact member movable by said manually operable means, a variable drive coupling said constant drive motor to said second shaft, said variable drive including two variable drive units, a cam driven by said fourth motor for operating one of said drive units, a fifth motor for operating the other of said variable drive units, a speed decay control unit cooperating with said velocity operated switch and said control switch, and means for actuating said speed decay control upon actuation of said second of said variable drive units.

28. A control unit as in claim 27, said control unit further comprising manually operable means controlling said fifth electric motor.

29. A control unit providing output data in the form of the rotative position of a shaft comprising a constant drive electric motor, a second electric motor, a first control switch for actuating said second motor including a movable contact unit driven thereby and a cooperating contact member, manually operable means for positioning said cooperating contact member, a variable drive coupling said constant drive motor to said shaft, said variable drive including two variable drive units, a cam driven by said second motor for operating one of said drive units, a third motor for operating the other of said drive units, a second control switch for actuating said third motor comprising a movable contact member driven thereby and a cooperating contact member, and second manually operable means for positioning said last-mentioned cooperating contact member.

30. Apparatus as in claim 25, said apparatus further comprising a frame, a carriage mounted on said frame, means for mounting said carriage for movement in two directions at right angles, and means responsive to the rotative positions of said two shafts for moving said carriage in said two directions.

31. A plotting device for indicating the relative positions of two movable objects comprising, a plotting surface, a pair of carriages for simulating the objects and adapted to project an indication on said plotting surface, a pair of superimposed frames disposed in spaced parallel relationship to said plotting surface, means for mounting one of said carriages on each of said frames for movement in two directions at right angles or any component thereof, said means for mounting said carriages including a track for supporting said carriage, rollers supporting said carriage for movement along said track, a pair of tracks extending at right angles to the first-named track, dollies carrying said first track and including rollers for operating on the second-named tracks, means secured to said carriage for moving it along the first track, said last-mentioned means including an endless cable operating on pulleys carried by said dollies, a shaft for driving one of said pulleys, a first motor responsive to data supplied thereto and a first adjustable gear train coupling said first motor to said shaft, and means for moving said dollies along the second-named tracks, said last-mentioned means including an endless cable operating on pulleys carried adjacent the respective ends of one of the second-named tracks, a second shaft for driving at least one of said last-mentioned pulleys, a second motor responsive to data supplied thereto, and a second adjustable gear train coupling said second motor to said second shaft.

32. In a training device, a control unit for generating outputs representing the forward speed and the course direction of a vehicle, said control unit comprising, an adjustable speed control element, means for generating a first signal normally indicative of the position of said speed control element, an adjustable steering control element, means responsive to said steering control element and said first signal for generating a second signal indicative of the course of said vehicle, and means coupling said steering control element to said means for generating said first signal, said last-mentioned coupling means causing said first signal to indicate a speed less than the speed represented by the setting of said speed control element as said steering control element is moved from a straight line course position.

33. A control unit as in claim 32 wherein said means coupling said steering control element to said means for generating said first signal causes said first signal to gradually decay from said speed represented by said setting of said speed control handle to said lesser speed.

34. A control unit for providing output data in the form of the rotative positions of a first and a second shaft comprising, a constant drive motor, a variable drive coupling said constant drive motor to said second shaft, said variable drive including two variable drive units, a first input control means, means coupling said first control means to said second variable drive to control the operation thereof, a second motor for rotating said first shaft, means including an adjustable velocity operated switch coupled to said second motor to control the speed thereof, a second input control means coupled to said adjustable velocity operated switch to control the operation thereof and means coupling said second input control means to said first variable drive unit to control the operation thereof.

35. A control unit for providing output data in the form of the rotative positions of a first and a second shaft comprising, a constant drive motor, a variable drive coupling said constant drive motor to said second shaft, said variable drive including two variable drive units, a first input control means, means coupling said first control means to said second variable drive unit to control the operation thereof, a second motor for rotating said first shaft, means including an adjustable velocity operated switch coupled to said second motor to control the speed thereof, a second input control means coupled to said adjustable velocity operated switch to control the operation thereof, means coupling said second input control means to said first variable drive unit to control the operation thereof, and means coupled to said second variable drive unit, said first control means and said adjustable velocity operated switch for controlling said adjustable velocity operated switch in response to operation of said first and second input control means.

36. A control unit for providing course and speed output data in the form of the rotative positions of a first and a second shaft comprising, a constant drive motor, a variable drive coupling said constant drive motor to said second shaft, said variable drive including two variable drive units, a course input control means, means coupling said course input control means to said second variable drive unit to control the operation thereof, a second motor for rotating said first shaft, means including an adjustable velocity operated switch coupled to said second motor to control the speed thereof, a speed input control means coupled to said adjustable velocity operated switch to control the operation thereof, means coupling said speed input control means to said first variable drive unit to control the operation thereof, and speed decay control means receiving mechanical inputs from said course input means and said speed input means, said speed decay control means being coupled to said adjustable velocity operated switch for controlling the operation thereof in response to operation of said course and speed input control means.

37. A control unit providing output data in the form of the rotative positions of a first and a second shaft comprising, a constant drive electric motor, a second electric motor for driving said first shaft, a current varying unit for controlling said second motor, a third motor for controlling said current-varying unit, a velocity operated switch actuated by said second motor for controlling said third motor, manually operable means for adjusting said switch, a fourth electric motor, a speed indicator operated by said fourth motor, a control switch for actuating said fourth motor including a rotatable contact unit driven thereby and a cooperating contact member movable by said manually operable means, a cam driven by said fourth motor, a variable drive from the constant drive motor to said second shaft, said drive including a first drive unit controlled by said cam and a second drive unit including a fifth motor, a rotatable screw driven by said fifth motor, a speed decay control unit operatively associated with said velocity operated switch and said control switch, means for actuating said speed decay control unit, said last-mentioned means including a wedge movable by said screw, a pivoted lever movable by said wedge, a second cam driven by said fourth motor for shifting the pivot point of said lever to vary the effective length thereof, a switch for controlling said fifth motor, said switch comprising a pair of elongated movable contacts, a helm member for moving said contacts, and a cooperating contact associated with said movable contacts and movable by said screw, all of said contacts being in the circuit with said fifth motor.

38. A course control unit providing output data in the form of the rotative position of an output shaft comprising, means providing an input shaft rotation proportional to the speed of a vehicle, a variable drive unit connecting said means to said output shaft, a reversible motor adapted to control said variable drive unit, a switch for controlling said motor, said switch comprising a pair of elongated movable contacts, a helm member for moving said contacts, a cooperating contact member associated with said movable contacts and movable by said motor, contact between said cooperating contact member and one of said movable contacts causing said motor to rotate in a first direction and contact between said cooperating contact member and the other of said movable contacts causing said motor to rotate in the opposite direction.

39. A course control unit providing output data in the form of the rotative position of an output shaft comprising, a means providing an input shaft rotation proportional to the speed of a vehicle, a variable drive unit connecting said means to said output shaft, a reversible motor adapted to control said drive unit, a switch for controlling said motor, said switch comprising a pair of laterally spaced, elongated movable contacts, a helm member for moving said contacts, a cooperating contact member associated with said movable contacts and laterally movable by said motor, contact between said cooperating contact member and one of said movable contacts causing said motor to rotate in a first direction and contact between said cooperating contact member and the other of said movable contacts causing said motor to rotate in the opposite direction, the spacing between said movable contact members being such that said cooperating contact member may occupy a position intermediate said movable contact members at which said motor is deenergized, delay means normally connected in the circuit of said motor to delay the energization thereof and means for removing said delay means from said motor circuit upon the movement of said cooperating contact member from said deenergized position.

40. Apparatus as in claim 34, said apparatus further comprising a frame, a carriage, means for mounting said carriage on said frame for movement in two mutually perpendicular directions, and means responsive to the rotative positions of said first and second shafts respectively for moving said carriage in said two directions.

41. Apparatus as in claim 36, said apparatus further comprising a frame, a carriage, means for mounting said carriage on said frame for movement in two mutually perpendicular directions, and means responsive to the rotative positions of said first and second shafts respectively for moving said carriage in said two directions.

WILLIAM L. MOREY.
ROBERT A. TAYLOR.

REFERENCES CITED

The following references are of record in the file of this patent:

UNITED STATES PATENTS

| Number | Name | Date |
| --- | --- | --- |
| 685,156 | Lincoln et al. | Oct. 22, 1901 |
| 1,377,294 | Trenor | May 10, 1921 |
| 1,985,265 | Smith | Dec. 25, 1934 |
| 2,027,926 | Myers et al. | Jan. 14, 1936 |
| 2,112,741 | Merrill | Mar. 29, 1938 |
| 2,193,707 | Bauman | Mar. 12, 1940 |
| 2,224,182 | Crooke | Dec. 10, 1940 |
| 2,296,032 | Hammond | Sept. 15, 1942 |
| 2,357,199 | Holst | Aug. 29, 1944 |
| 2,366,603 | Dehmel | Jan 2, 1945 |
| 2,389,359 | Grow | Nov. 20, 1945 |
| 2,413,300 | Dunn et al. | Dec. 31, 1946 |
| 2,491,308 | Gorton et al. | Dec. 13, 1949 |